US012593359B2

(12) United States Patent
Jiang

(10) Patent No.: US 12,593,359 B2
(45) Date of Patent: Mar. 31, 2026

(54) RANDOM ACCESS METHOD AND APPARATUS, AND ELECTRONIC DEVICE

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 313 days.

(21) Appl. No.: 18/260,551

(22) PCT Filed: Jan. 6, 2021

(86) PCT No.: PCT/CN2021/070537
§ 371 (c)(1),
(2) Date: Jul. 6, 2023

(87) PCT Pub. No.: WO2022/147699
PCT Pub. Date: Jul. 14, 2022

(65) Prior Publication Data
US 2024/0064816 A1     Feb. 22, 2024

(51) Int. Cl.
*H04W 74/08*     (2024.01)
*H04W 74/04*     (2009.01)
*H04W 74/0833*     (2024.01)
*H04W 76/19*     (2018.01)

(52) U.S. Cl.
CPC ....... *H04W 74/0833* (2013.01); *H04W 74/04* (2013.01); *H04W 76/19* (2018.02)

(58) Field of Classification Search
CPC ............. H04W 74/0833; H04W 74/04; H04W 74/0836; H04W 74/004; H04W 74/006; H04W 76/19
See application file for complete search history.

(56) References Cited

U.S. PATENT DOCUMENTS

2021/0028848 A1 * 1/2021 Tsai ...................... H04W 16/28
2021/0028905 A1 * 1/2021 Lei ........................ H04L 5/0044

FOREIGN PATENT DOCUMENTS

| CN | 110169189 A | 8/2019 |
|----|-------------|--------|
| CN | 111213334 A | 5/2020 |
| CN | 111819905 A | 10/2020 |
| CN | 112153741 A | 12/2020 |
| WO | 2020063757 A1 | 4/2020 |

OTHER PUBLICATIONS

"On 2-step random access procedure and physical channel in NR," Proceedings of the 3GPP TSG RAN WG1 Meeting #87, R1-1700172, MediaTek Inc., Jan. 16, 2020, Spokane, Washington, 7 pages.

(Continued)

*Primary Examiner* — Jamal Javaid
(74) *Attorney, Agent, or Firm* — McCoy Russell LLP

(57) ABSTRACT

A random access method includes: determining a trigger source for 2-STEP random access; and according to the trigger source for the 2-STEP random access, triggering 2-STEP random access correspondingly; where triggering 2-STEP random access includes: determining that the trigger source is beam failure recovery (BFR) for secondary cell and there are no available uplink resources, and triggering the 2-STEP random access to request the available uplink resources.

18 Claims, 9 Drawing Sheets

S101

Determine a trigger source for 2-STEP random access

S102

According to the trigger source for the 2-STEP random access, trigger 2-STEP random access correspondingly

(56)　　　　　　References Cited

OTHER PUBLICATIONS

"Remaining issues on 2-step random access resource," Proceedings of the 3GPP TSG-RAN WG2 #107bis, R2-1913872, LG Electronics Inc., Oct. 14, 2019, Chongqing, China, 2 pages.

"Discussion on remaining issues on multi beam enhancement," Proceedings of the 3GPP TSG RAN WG1 #98bis, R1-1910230, Vivo, Oct. 14, 2019, Chongqing, China, 9 pages.

"Enhancements on UL scheduling for NTN," Proceedings of the 3GPP TSG-RAN WG2 #112-e, R2-2009064, Nomor Research GmbH, Thales, Nov. 2, 2020, e-Meeting, 5 pages.

"Criteria for performing 2 step or 4 step RACH based SDT," Proceedings of the 3GPP TSG-RAN2 Meeting #112 Electronic, R2-2009096, Samsung, Nov. 2, 2020, e-Meeting, 4 pages.

* cited by examiner

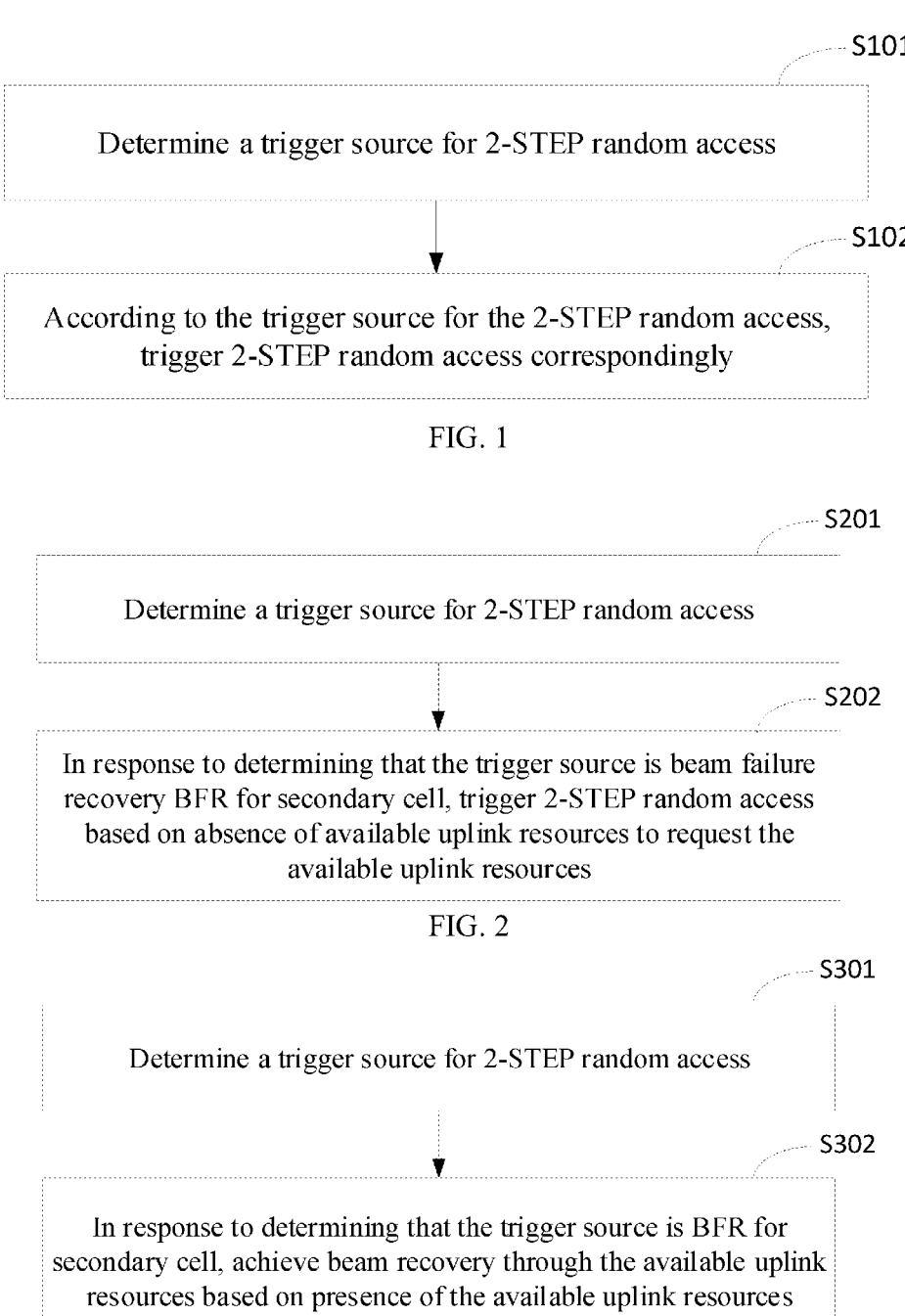

S101

Determine a trigger source for 2-STEP random access

S102

According to the trigger source for the 2-STEP random access, trigger 2-STEP random access correspondingly

Determine a trigger source for 2-STEP random access

S202

In response to determining that the trigger source is beam failure recovery BFR for secondary cell, trigger 2-STEP random access based on absence of available uplink resources to request the available uplink resources

Determine a trigger source for 2-STEP random access

S302

In response to determining that the trigger source is BFR for secondary cell, achieve beam recovery through the available uplink resources based on presence of the available uplink resources

FIG. 3

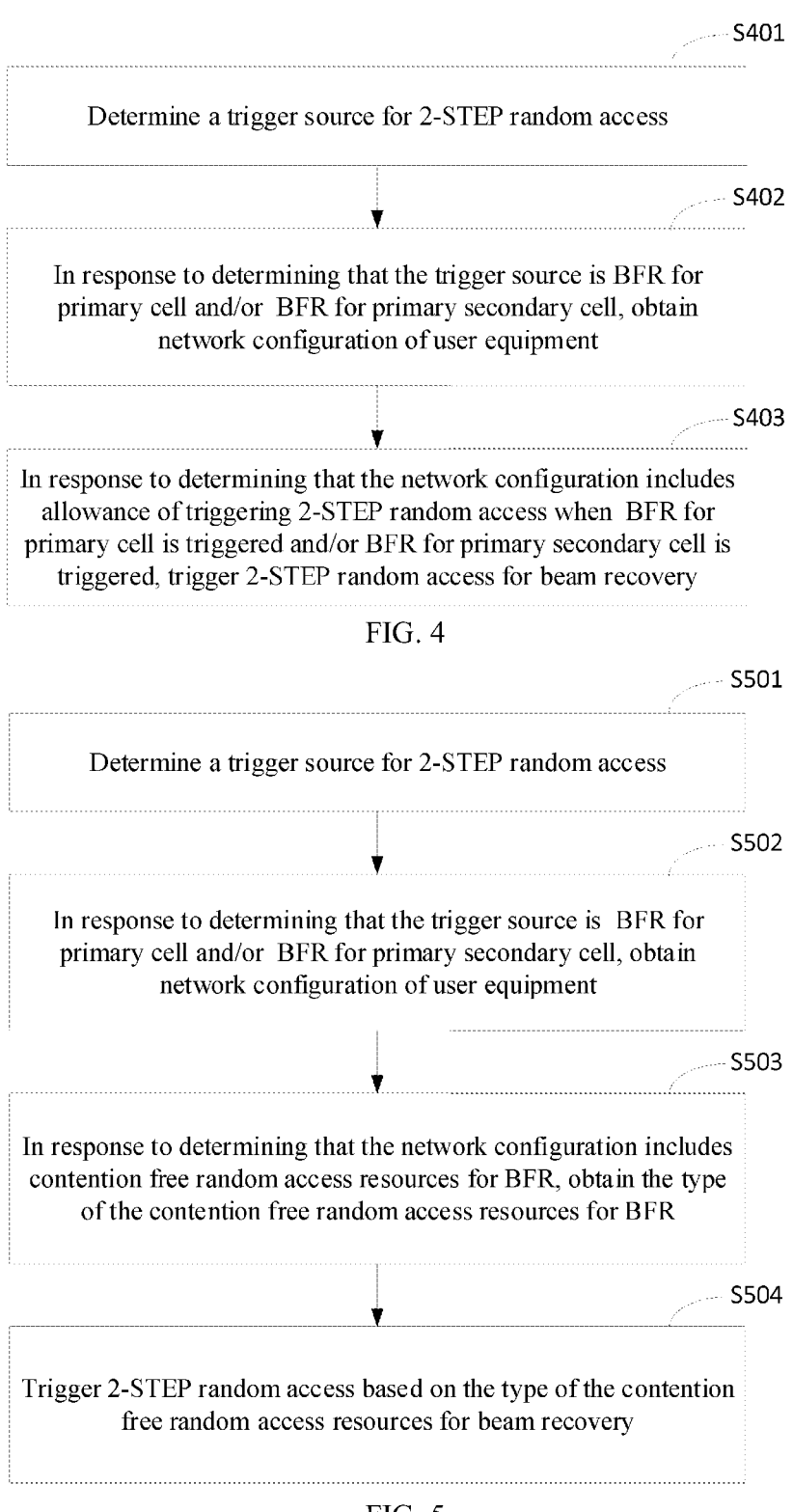

S401

Determine a trigger source for 2-STEP random access

S402

In response to determining that the trigger source is BFR for primary cell and/or BFR for primary secondary cell, obtain network configuration of user equipment

S403

In response to determining that the network configuration includes allowance of triggering 2-STEP random access when BFR for primary cell is triggered and/or BFR for primary secondary cell is triggered, trigger 2-STEP random access for beam recovery

Determine a trigger source for 2-STEP random access

S502

In response to determining that the trigger source is BFR for primary cell and/or BFR for primary secondary cell, obtain network configuration of user equipment

S503

In response to determining that the network configuration includes contention free random access resources for BFR, obtain the type of the contention free random access resources for BFR

S504

Trigger 2-STEP random access based on the type of the contention free random access resources for beam recovery

FIG. 5

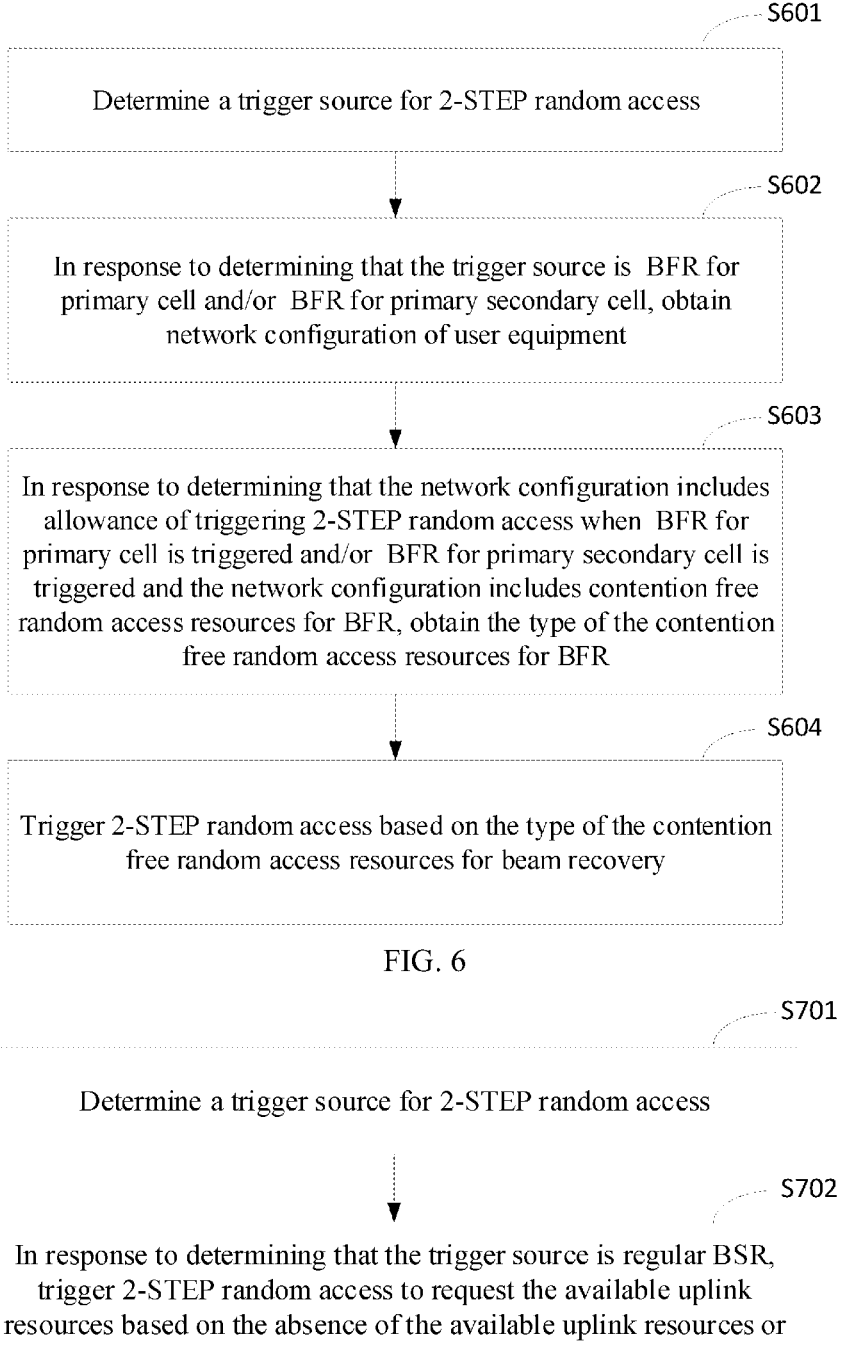

S601

Determine a trigger source for 2-STEP random access

S602

In response to determining that the trigger source is BFR for primary cell and/or BFR for primary secondary cell, obtain network configuration of user equipment

S603

In response to determining that the network configuration includes allowance of triggering 2-STEP random access when BFR for primary cell is triggered and/or BFR for primary secondary cell is triggered and the network configuration includes contention free random access resources for BFR, obtain the type of the contention free random access resources for BFR

S604

Trigger 2-STEP random access based on the type of the contention free random access resources for beam recovery

Determine a trigger source for 2-STEP random access

S702

In response to determining that the trigger source is regular BSR, trigger 2-STEP random access to request the available uplink resources based on the absence of the available uplink resources or failure of present available uplink resources to meet LCP mapping restriction of the logical channel triggering the BSR

FIG. 7

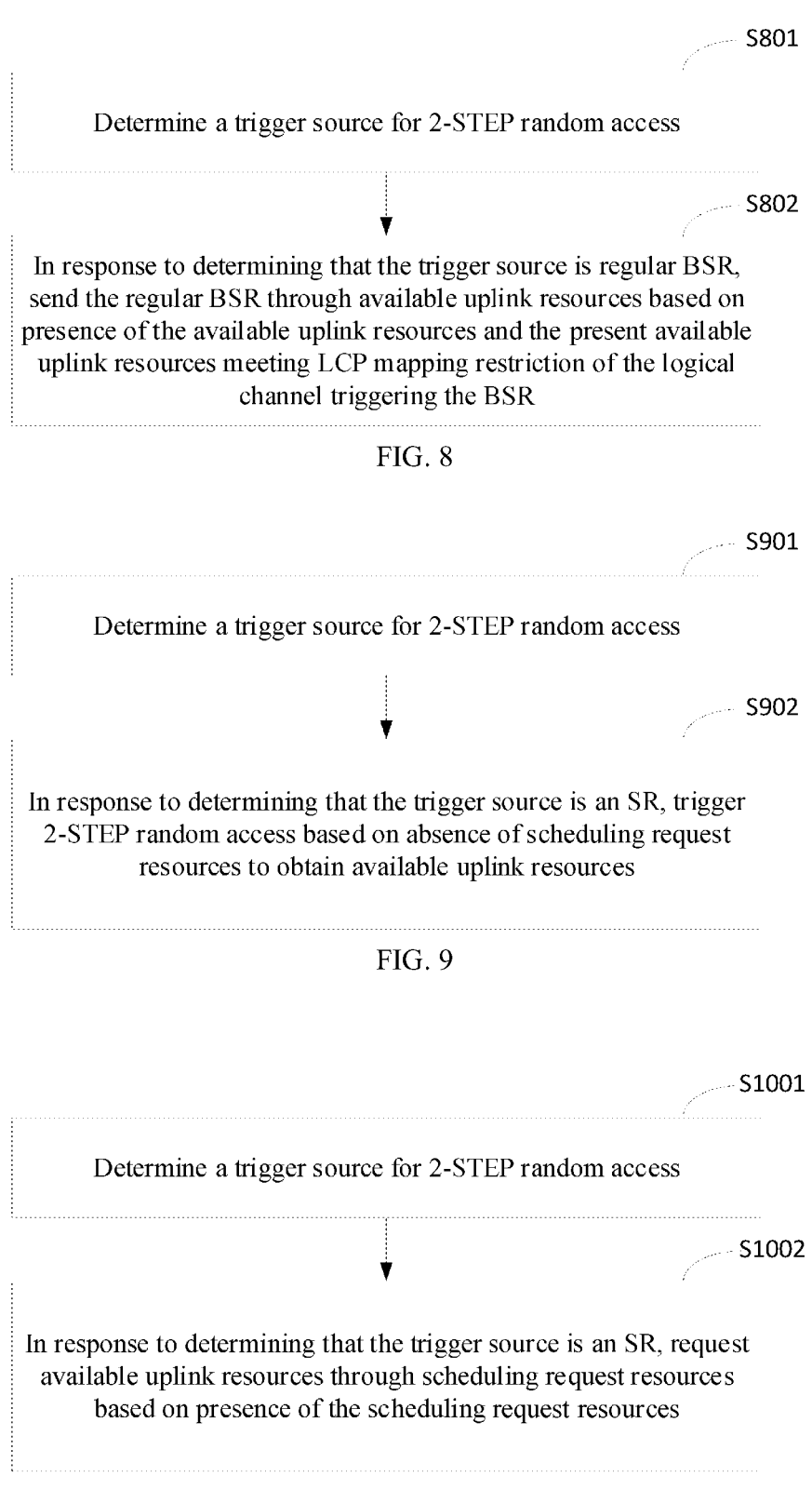

S801

Determine a trigger source for 2-STEP random access

S802

In response to determining that the trigger source is regular BSR, send the regular BSR through available uplink resources based on presence of the available uplink resources and the present available uplink resources meeting LCP mapping restriction of the logical channel triggering the BSR

Determine a trigger source for 2-STEP random access

S902

In response to determining that the trigger source is an SR, trigger 2-STEP random access based on absence of scheduling request resources to obtain available uplink resources

Determine a trigger source for 2-STEP random access

S1002

In response to determining that the trigger source is an SR, request available uplink resources through scheduling request resources based on presence of the scheduling request resources

FIG. 10

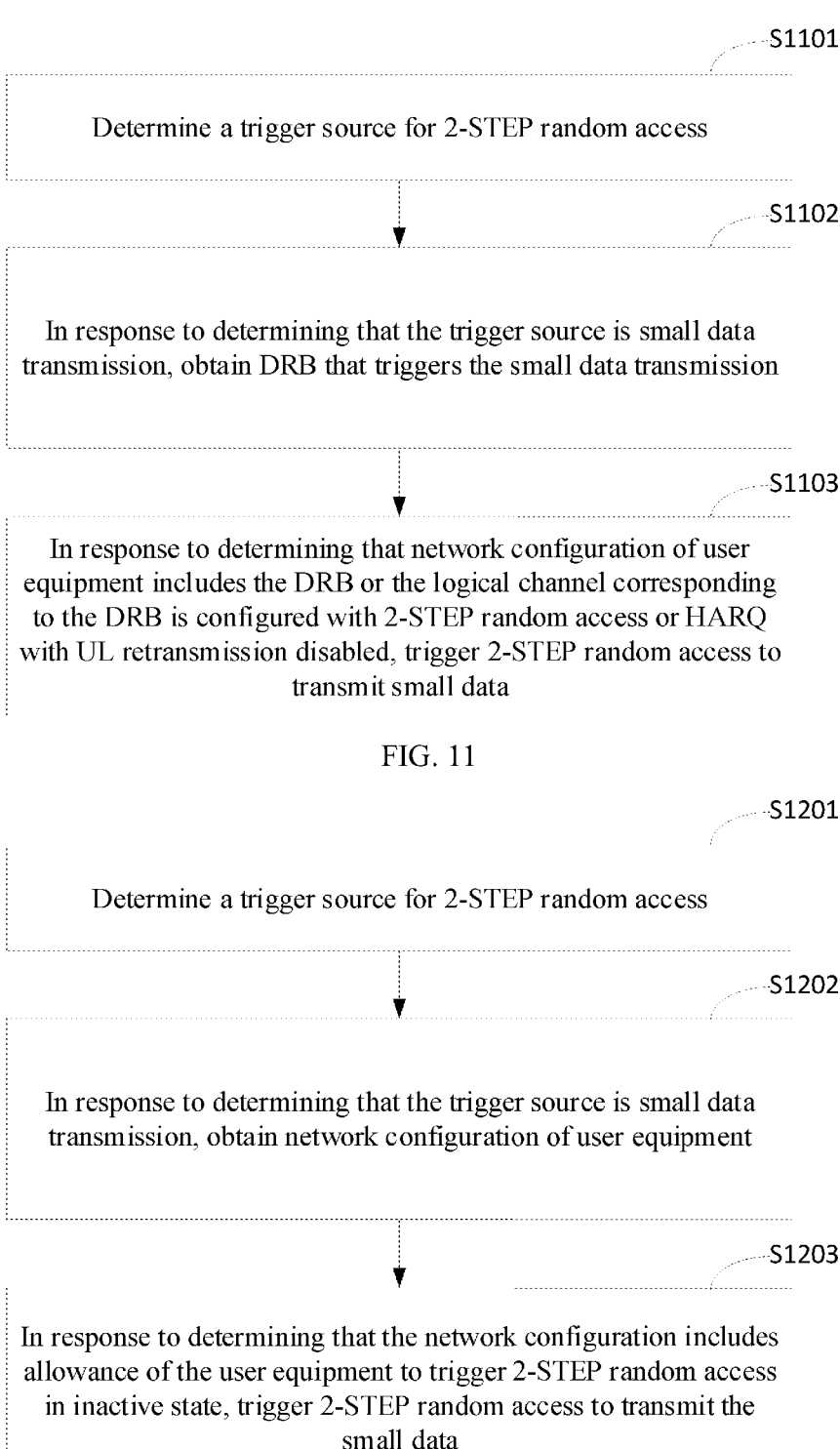

S1101

Determine a trigger source for 2-STEP random access

S1102

In response to determining that the trigger source is small data transmission, obtain DRB that triggers the small data transmission

S1103

In response to determining that network configuration of user equipment includes the DRB or the logical channel corresponding to the DRB is configured with 2-STEP random access or HARQ with UL retransmission disabled, trigger 2-STEP random access to transmit small data

Determine a trigger source for 2-STEP random access

S1202

In response to determining that the trigger source is small data transmission, obtain network configuration of user equipment

S1203

In response to determining that the network configuration includes allowance of the user equipment to trigger 2-STEP random access in inactive state, trigger 2-STEP random access to transmit the small data

FIG. 12

S1301
Receive a 2-STEP random access request sent by user equipment, where the 2-STEP random access request is initiated by the user equipment based on a trigger source
FIG. 13
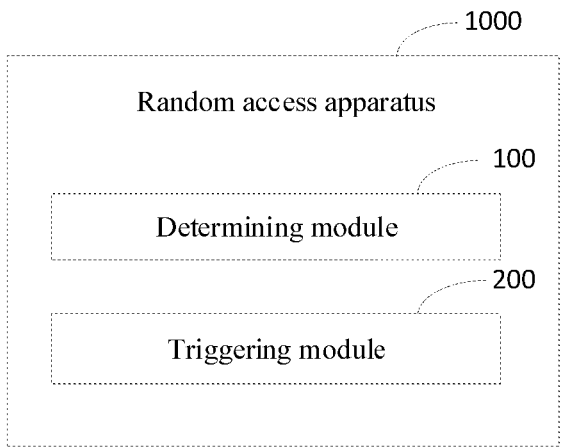
1000
Random access apparatus
100
Determining module
200
Triggering module
FIG. 14
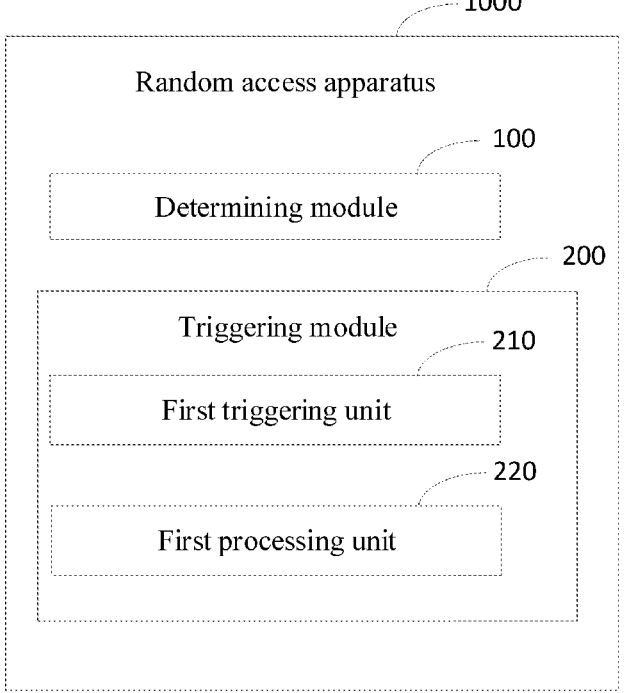
1000
Random access apparatus
100
Determining module
200
Triggering module
210
First triggering unit
220
First processing unit
FIG. 15

RANDOM ACCESS METHOD AND APPARATUS, AND ELECTRONIC DEVICE

CROSS REFERENCE TO RELATED APPLICATION

The present application is a U.S. National Phase of International Application No. PCT/CN2021/070537 entitled "RANDOM ACCESS METHOD AND APPARATUS, AND ELECTRONIC DEVICE," and filed on Jan. 6, 2021. The entire contents of the above-listed application are hereby incorporated by reference for all purposes.

BACKGROUND

In recent years, Non-terrestrial Network (NTN has been an important technology introduced by 5G, providing wireless resources through satellites (or drones) instead of ground base stations. For NTN, due to the long Round Trip Time (RTT), random access (RA) through 4-STEP to RA results in a large number of interaction steps and too large access delay.

SUMMARY

A random access method provided in an embodiment of a first aspect of the present disclosure includes:

determining a trigger source for 2-STEP random access; and according to the trigger source for the 2-STEP random access, triggering 2-STEP random access correspondingly;

where triggering 2-STEP random access includes:

determining that the trigger source is beam failure recovery (BFR) for a secondary cell and there are no available uplink resources; and triggering the 2-STEP random access to request the available uplink resources.

A random access method provided in an embodiment of a second aspect of the present disclosure includes:

receiving a 2-STEP random access request sent by user equipment;

where the 2-STEP random access request is initiated by the user equipment based on a trigger source; or the 2-STEP random access request is a 2-STEP random access request configured to request available uplink resources and sent by the user equipment in response to determining that the trigger source is BFR for a secondary cell and there are no the available uplink resources.

An electronic device provided in an embodiment of a third aspect of the present disclosure includes:

at least one processor; and a memory communicatively connected to the at least one processor, where the memory stores instructions executable by the at least one processor, and when the instructions are executed by the at least one processor, the at least one processor is configured to:

determine a trigger source for 2-STEP random access; and according to the trigger source for the 2-STEP random access, trigger 2-STEP random access correspondingly;

where triggering 2-STEP random access includes:

determining that the trigger source is beam failure recovery (BFR) for a secondary cell and there are no available uplink resources; and triggering the 2-STEP random access to request the available uplink resources.

An electronic device provided in an embodiment of a fourth aspect of the present disclosure includes:

at least one processor; and a memory communicatively connected to the at least one processor, where the memory stores instructions executable by the at least one processor, and the at least one processor is caused to, when the instructions are executed by the at least one processor, perform the random access method described in the embodiments of the second aspect of the disclosure.

Additional aspects and advantages of the present disclosure will partially be set forth in the following description, and will become apparent from the following description, or will be learned by practice of the present disclosure.

BRIEF DESCRIPTION OF THE DRAWINGS

The foregoing and/or additional aspects and advantages of the present disclosure will become apparent and readily appreciated from the following description of the embodiments in conjunction with the accompanying drawings.

FIG. 1 is a schematic diagram of a random access method provided by an embodiment of the present disclosure;

FIG. 2 is a schematic diagram of another random access method provided by an embodiment of the present disclosure;

FIG. 3 is a schematic diagram of another random access method provided by an embodiment of the present disclosure;

FIG. 4 is a schematic diagram of another random access method provided by an embodiment of the present disclosure;

FIG. 5 is a schematic diagram of another random access method provided by an embodiment of the present disclosure;

FIG. 6 is a schematic diagram of another random access method provided by an embodiment of the present disclosure;

FIG. 7 is a schematic diagram of another random access method provided by an embodiment of the present disclosure;

FIG. 8 is a schematic diagram of another random access method provided by an embodiment of the present disclosure;

FIG. 9 is a schematic diagram of another random access method provided by an embodiment of the present disclosure;

FIG. 10 is a schematic diagram of another random access method provided by an embodiment of the present disclosure;

FIG. 11 is a schematic diagram of another random access method provided by an embodiment of the present disclosure;

FIG. 12 is a schematic diagram of another random access method provided by an embodiment of the present disclosure;

FIG. 13 is a schematic diagram of another random access method provided by an embodiment of the present disclosure;

FIG. 14 is a schematic structural diagram of a random access apparatus according to an embodiment of the present disclosure;

FIG. 15 is a schematic structural diagram of another random access apparatus according to an embodiment of the present disclosure;

DETAILED DESCRIPTION

Figure 16:
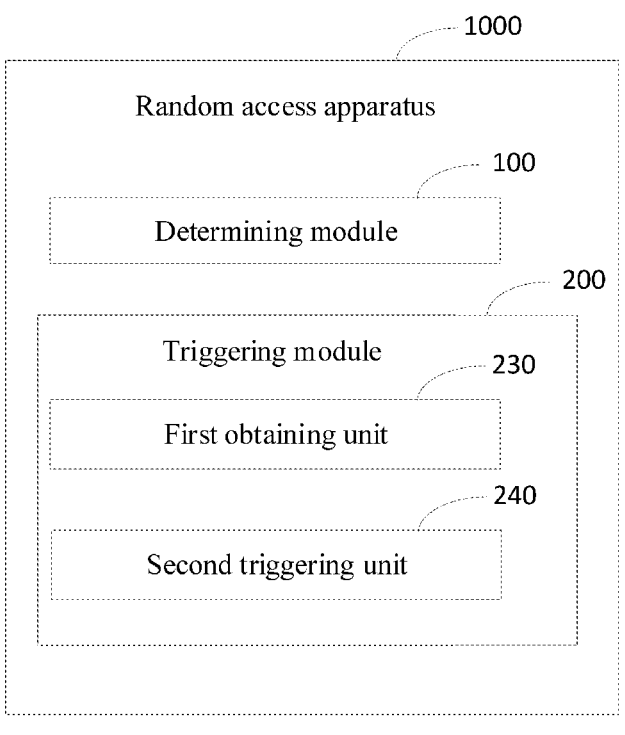
FIG. 16 is a schematic structural diagram of another random access apparatus according to an embodiment of the present disclosure.

Examples will be described in detail here, and instances thereof are shown in the accompanying drawings. The following description refers to the accompanying drawings in which the same numbers in different figures represent the same or similar elements unless otherwise indicated. Implementations set forth in the following description of examples do not represent all implementations consistent with the present disclosure. Instead, the implementations are merely examples of apparatuses and methods consistent with some aspects of the embodiments of the present disclosure as detailed in the appended claims.

The terms used in the embodiments of the present disclosure are merely for describing specific embodiments, rather than limiting the embodiments of the present disclosure. The terms "a/an" and "the" in singular forms used in the embodiments and the appended claims of the present disclosure are also intended to include plural forms, unless otherwise clearly indicated in the context. It should be further understood that the term "and/or" used in the specification refers to and includes any or all possible combinations of one or more associated listed items.

It should be understood that although the terms "first," "second," "third," and the like may be used in the embodiments of the present disclosure to describe all types of information, the information is not limited to the terms. The terms are merely used to distinguish the same type of information from one another. For example, without departing from the scope of the embodiments of the present disclosure, the first information may also be referred to as second information, and similarly, the second information may also be referred to as first information. Depending on the context, the words "if" and "as if" as used in the specification may be interpreted as "when," "while," or "in response to determining".

The embodiments of the present disclosure are described in detail below, and the examples of the embodiments are shown in the drawings, where the same or similar reference numerals throughout represent the same or similar elements. The embodiments described below with reference to the accompanying drawings are exemplary, are intended to explain the present disclosure, and cannot be understood as limitations to the present disclosure.

The disclosure relates to the technical field of wireless communication, and in particular to a random access method and apparatus, and an electronic device.

The random access method and apparatus, and an electronic device provided in the disclosure are used to solve the problems of a large number of interaction steps and too large access delay when using 4-STEP for random access to RA in NTN in the related art.

In the related art, for NTN, random access through 4-STEP to RA results in a large number of interaction steps and too large access delay.

To solve the problems, the embodiments of the present disclosure provide a random access method and apparatus, and an electronic device.

FIG. 1 is a schematic diagram of a random access method provided in the present disclosure. It should be noted that the random access method according to the present disclosure may be executed on user equipment.

As shown in FIG. 1, the random access method provided in the present disclosure includes the following steps:

S101, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission (SDT), etc. Where BFR, BSR and SR are triggered by User Equipment (UE) in a connected state; while small data transmission is triggered by UE in an inactive state.

In the present disclosure, BFR refers to that for a serving cell of the UE in the connected state, based on a network configuration, the UE monitors the quality of a set of beams signal, which are used for base station communication corresponding to the service cell; if the currently monitored beam signal quality does not meet the certain requirements, a physical layer of the UE indicates beam failure to an media access control layer MAC; when the physical layer indicates that beam failure of the MAC layer reaches a certain number of times, the MAC layer triggers a BFR process, and the UE monitors a new set of beams based on the network configuration. Where the serving cell is, for example, a primary cell (PCell), a primary secondary cell (PSCell) and a secondary cell (SCell).

In the present disclosure, the BSR refers to that for the UE in the connected state, the UE triggers the BSR when needing to report the BSR. Small data transmission refers to that for the UE in the inactive state, small data transmission is triggered when small data transmission is required.

The base station mentioned in the present disclosure may refer to a base station in a transparent mode or a satellite in a regenerative mode. In the transparent mode, an NTN ground station sends gNB signals of the base station to the satellite, the satellite converts the signals to the satellite frequency band and then sends the signals to the UE through the satellite frequency band. In addition to frequency conversion and signal amplification, the satellite does not demodulate the gNB signals. In the regeneration mode, the NTN ground station sends the gNB signals from the base station to the satellite, the satellite demodulates and decodes the signals before recoding and modulating the signals. This process is called regeneration, and the regenerated signals are sent through the satellite frequency band.

S102, according to the trigger source for the 2-STEP random access, triggering 2-STEP random access correspondingly.

In the present disclosure, there are two types of random access: 4-STEP random access and 2-STEP random access.

4-STEP random access includes 4 steps. Step 1: UE sends Random Access Preamble to a base station; Step 2: the base station returns Random Access Response to the UE; Step 3: the UE sends Scheduled Transmission to the base station; Step 4, the base station returns Content Resolution to the UE. 2-STEP random access includes 2 steps. Step 1 is MsgA, which is equivalent to the Step 1+Step 3 of 4-STEP random access; Step 2 is MsgB, which is equivalent to the Step 2+Step 4 of 4-STEP random access.

A random access method is provided in the present disclosure. The method may be executed separately or in conjunction with other methods disclosed in the present disclosure. It should be noted that the random access method according to the present disclosure may be executed on UE. The method includes: in response to determining that the trigger source which triggers 2-STEP random access is BFR, obtaining reference signal received power (RSRP) threshold corresponding to the trigger source, comparing the RSRP of downlink path loss reference of Bandwidth Part (BWP) with the RSRP threshold, and initiating 2-STEP random access when the RSRP of the downlink path loss reference of BWP is greater than or equal to the RSRP threshold.

A random access method is provided in the present disclosure. The method may be executed separately or in conjunction with other methods disclosed in the present disclosure. It should be noted that the random access method according to the present disclosure may be executed on UE. The method includes: in response to determining that the trigger source which triggers 2-STEP random access is BSR, obtaining RSRP threshold corresponding to the trigger source, comparing the RSRP of downlink path loss reference of BWP with the RSRP threshold, and initiating 2-STEP random access when the RSRP of the downlink path loss reference of BWP is greater than or equal to the RSRP threshold.

A random access method is provided in the present disclosure. The method may be executed separately or in conjunction with other methods disclosed in the present disclosure. It should be noted that the random access method according to the present disclosure may be executed on UE. The method includes: in response to determining that the trigger source which triggers 2-STEP random access is SR, obtaining RSRP threshold corresponding to the trigger source, comparing the RSRP of downlink path loss reference of BWP with the RSRP threshold, and initiating 2-STEP random access when the RSRP of the downlink path loss reference of BWP is greater than or equal to the RSRP threshold.

A random access method is provided in the present disclosure. The method may be executed separately or in conjunction with other methods disclosed in the present disclosure. It should be noted that the random access method according to the present disclosure may be executed on UE. The method includes: in response to determining that the trigger source which triggers 2-STEP random access is small data transmission, obtaining RSRP threshold corresponding to the trigger source, comparing the RSRP of downlink path loss reference of BWP with the RSRP threshold, and initiating 2-STEP random access when the RSRP of the downlink path loss reference of BWP is greater than or equal to the RSRP threshold.

In the present disclosure, when the UE triggers the BFR, 2-STEP random access may be triggered to quickly access the base station and achieve beam recovery; when the UE triggers the BSR, 2-STEP random access may be triggered to quickly access the base station and achieve the sending of the BSR; when the UE triggers the SR, 2-STEP random access may be triggered to quickly access the base station and achieve the sending of the SR; and when the UE triggers small data transmission, 2-STEP random access may be triggered to quickly access the base station and achieve the small data transmission.

According to the random access method in the embodiments of the present disclosure, the trigger source for 2-STEP random access may be determined; according to the trigger source for 2-STEP random access, 2-STEP random access may be triggered correspondingly. As a result, 2-STEP random access is able to be triggered based on the trigger source for 2-STEP random access, and interaction steps and access delay are reduced.

As one possible implementation, as shown in FIG. 2, the random access method provided in the present disclosure includes the following steps:

S201, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by UE in a connected state; while small data transmission is triggered by UE in an inactive state.

S202, in response to determining that the trigger source is beam failure recovery BFR for a secondary cell, triggering 2-STEP random access based on absence of available uplink resources to request the available uplink resources.

In the present disclosure, the available uplink resources may include at least one of the following: available uplink resources for sending BFR media access control layer control element MAC CE; available uplink resources for sending truncated BFR MAC CE; and available uplink resources with uplink (UL) retransmission of the corresponding hybrid automatic repeat request (HARQ) not disabled.

In the present disclosure, the HARQ refers to that after the UE sends uplink transmission to the base station, the base station receives and demodulates the uplink transmission, and decides whether to perform scheduling retransmission according to the demodulation result. Due to the long Round Trip Time (RTT) of NTN, the retransmission mechanism might cause data or instructions to take a long time to be successfully retransmitted. As a result, it is necessary to disable the HARQ function for some HARQs, that is, disable the UL retransmission function. The network configuration of the UE includes that the BFR MAC CE is unable to use the HARQ with UL retransmission disabled. As a result, when sending the BFR MAC CE, if the available uplink resources with UL retransmission of the corresponding HARQ not disabled are absent, and the available uplink resources for sending the BFR MAC CE or for sending the truncated BFR MAC CE are absent, 2-STEP random access needs to be triggered to request the available uplink resources.

In the present disclosure, the network configuration of the UE may further include one or more of the following MAC CEs that are unable to use the HARQ with UL retransmission disabled: configured grant confirmation MAC CE, multiple entry configured grant confirmation MAC CE, Power Headroom Report (PHR) MAC CE and BSR MAC CE. For the above MAC CEs, they are unable to be sent through the available uplink resources with the UL retransmission of the corresponding HARQ disabled, and they need to be sent through available uplink resources with the UL retransmission of the corresponding HARQ not disabled.

A random access method is provided in the present disclosure. The method may be executed separately or in conjunction with other methods disclosed in the present disclosure. It should be noted that the random access method according to the present disclosure may be executed on UE. The method includes: after triggering random access, the UE may select the Bandwidth Part (BWP) to initiate random access; in response to determining that the BWP is configured with 2-STEP random access resources, the UE initiates 2-STEP random access; or, in response to determining that BWP is not configured with 2-STEP random access resources, the UE initiates 4-STEP random access.

A random access method is provided in the present disclosure. The method may be executed separately or in conjunction with other methods disclosed in the present disclosure. It should be noted that the random access method according to the present disclosure may be executed on UE. The method includes: after triggering random access, the UE may select the BWP to initiate random access; and in response to determining that the BWP is configured with 2-STEP random access resources, the UE initiates 2-STEP random access. When the BWP is configured with the 2-STEP random access resources, the UE may first obtain RSRP for downlink path loss reference of the BWP; the UE obtains RSRP threshold corresponding to the trigger source which triggers 2-STEP random access; where different triggering sources correspond to different RSRP thresholds; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

A random access method is provided in the present disclosure. The method may be executed separately or in conjunction with other methods disclosed in the present disclosure. It should be noted that the random access method according to the present disclosure may be executed on UE. The method includes: after triggering random access, the UE may choose to initiate contention free random access (CFRA) or competitive random access. Where the selection of which type of random access to initiate depends on whether there are dedicated random access resources for BFR for the secondary cell. If there are, contention free random access is initiated; otherwise, competitive random access is initiated.

A random access method is provided in the present disclosure. The method may be executed separately or in conjunction with other methods disclosed in the present disclosure. It should be noted that the random access method according to the present disclosure may be executed on UE. The method includes: after triggering random access, the UE may select the BWP to initiate random access; when the BWP is configured with 2-STEP random access resources, the UE initiates 2-STEP random access; or, when the BWP is not configured with 2-STEP random access resources, the UE initiates 4-STEP random access.

A random access method is provided in the present disclosure. The method may be executed separately or in conjunction with other methods disclosed in the present disclosure. It should be noted that the random access method according to the present disclosure may be executed on UE. The method includes: after triggering random access, the UE may select the BWP to initiate random access; when the BWP is configured with 2-STEP random access resources, the UE initiates 2-STEP random access. When the BWP is configured with the 2-STEP random access resources, the UE may first obtain RSRP for downlink path loss reference of the BWP; the UE obtains RSRP threshold corresponding to BFR for the secondary cell which triggers 2-STEP random access; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; in response to determining that the trigger source is BFR for the secondary cell, 2-STEP random access is triggered to request available uplink resources based on absence of the available uplink resources. As a result, when the BFR for the secondary cell is triggered, 2-STEP random access is able to be triggered to send BFR MAC CE, and interaction steps are reduced and beam recovery speed is improved.

As another possible implementation, as shown in FIG. 3, the random access method provided in the present disclosure includes the following steps:

S301, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by User Equipment (UE) in a connected state; while small data transmission is triggered by UE in an inactive state.

S302, in response to determining that the trigger source is beam failure recovery BFR for a secondary cell, achieving beam recovery through available uplink resources based on presence of the available uplink resources.

In the present disclosure, the available uplink resources may include at least one of the following: available uplink resources for sending BFR MAC CE; available uplink resources for sending truncated BFR MAC CE; and available uplink resources with UL retransmission of the corresponding HARQ not disabled.

In the present disclosure, based on the presence of the available uplink resources, the UE may directly send BFR MAC CE or truncate BFR MAC CE through the available uplink resources, and a new set of beams is monitored and beam recovery is achieved.

According to the random access method in the embodiments of the present disclosure, the trigger source for 2-STEP random access may be determined; in response to determining that the trigger source is BFR for the secondary cell, beam recovery is achieved through available uplink resources based on presence of the available uplink resources. Thus, the beam recovery speed is improved.

As another possible implementation, as shown in FIG. 4, the random access method provided in the present disclosure includes the following steps:

S401, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by User Equipment (UE) in a connected state; while small data transmission is triggered by UE in an inactive state.

S402, in response to determining that the trigger source is beam failure recovery BFR for a primary cell and/or beam failure recovery BFR for a primary secondary cell, obtaining a network configuration of user equipment.

In the present disclosure, the network configuration of the UE may include one or more of the following: allowance of triggering 2-STEP random access when BFR for the primary cell is triggered and/or BFR for the primary secondary cell is triggered, contention free random access resources for BFR, etc.

S403, in response to determining that the network configuration includes allowance of triggering 2-STEP random access when BFR for the primary cell is triggered and/or BFR for the primary secondary cell is triggered, triggering 2-STEP random access for beam recovery.

In the present disclosure, based on the network configuration of the UE including allowance of triggering 2-STEP random access when BFR for the primary cell is triggered and/or BFR for the primary secondary cell is triggered but not including contention free random access resources for BFR, the UE may only initiate competitive random access.

According to the random access method in the embodiments of the present disclosure, the trigger source for 2-STEP random access may be determined; in response to determining that the trigger source is BFR for the primary cell and/or BFR for the primary secondary cell, the network configuration of the UE is obtained; and in response to determining that the network configuration includes allowance of triggering 2-STEP random access when BFR for the primary cell is triggered and/or BFR for the primary secondary cell is triggered, 2-STEP random access is triggered for beam recovery, as a result, when BFR for the primary cell is triggered and/or BFR for the primary secondary cell is triggered, 2-STEP random access is able to be triggered for beam recovery, and access delay is reduced and beam recovery is improved.

A random access method is provided in the present disclosure. The method may be executed separately or in conjunction with other methods disclosed in the present disclosure. It should be noted that the random access method according to the present disclosure may be executed on UE. The method includes: in response to determining that competitive random access is initiated by the UE, obtaining the BWP to initiate random access; when the BWP is configured with 2-STEP random access resources, initiating 2-STEP random access for beam recovery; or, when the BWP is not configured with 2-STEP random access resources, initiating 4-STEP random access for beam recovery.

A random access method is provided in the present disclosure. The method may be executed separately or in conjunction with other methods disclosed in the present disclosure. It should be noted that the random access method according to the present disclosure may be executed on UE. The method includes: in response to determining that competitive random access is initiated by the UE, obtaining the BWP to initiate random access; when the BWP is configured with 2-STEP random access resources, initiating 2-STEP random access for beam recovery. When the BWP is configured with the 2-STEP random access resources, the UE may first obtain RSRP for downlink path loss reference of the BWP; the UE obtains RSRP threshold corresponding to BFR for the secondary cell which triggers 2-STEP random access; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

As another possible implementation, as shown in FIG. 5, the random access method provided in the present disclosure includes the following steps:

S501, determining a trigger source for 2-STEP random access.

In the present disclosure, the trigger source for 2-STEP random access is, for example, BFR (Beam Failure Recovery), BSR (Buffer Status Report), SR (Scheduling Request), small data transmission, etc. Where BFR, BSR and SR are triggered by UE (User Equipment) in a connected state; while small data transmission is triggered by UE in an inactive state.

S502, in response to determining that the trigger source is beam failure recovery BFR for a primary cell and/or beam failure recovery BFR for a primary secondary cell, obtaining a network configuration of UE.

In the present disclosure, the network configuration of the UE may include one or more of the following: allowance of triggering 2-STEP random access when BFR for the primary cell is triggered and/or BFR for the primary secondary cell is triggered, contention free random access resources for BFR, etc.

S503, in response to determining that the network configuration includes contention free random access resources for BFR, obtaining the type of the contention free random access resources for BFR.

S504, triggering 2-STEP random access based on the type of the contention free random access resources for beam recovery.

A random access method is provided in the present disclosure. The method may be executed separately or in conjunction with other methods disclosed in the present disclosure. It should be noted that the random access method according to the present disclosure may be executed on UE. The method includes: when contention free random access resources for BFR are included in the network configuration of the UE, the UE is able to initiate contention free random access and determine the type of triggered random access based on the type of the contention free random access resources for BFR. For example, when the type of the contention free random access resources for BFR is 2-STEP, 2-STEP random access is triggered for beam recovery; or, when the type of the contention free random access resources for BFR is 4-STEP, 4-STEP random access is triggered for beam recovery.

A random access method is provided in the present disclosure. The method may be executed separately or in conjunction with other methods disclosed in the present disclosure. It should be noted that the random access method according to the present disclosure may be executed on UE. The method includes: in response to determining that the type of the contention free random access resources for BFR is 2-STEP, the UE may also select the BWP which initiates random access from the contention free random access resources, and obtain RSRP for downlink path loss reference of the BWP; the UE obtains RSRP thresholds corresponding to BFR for the primary cell and/or BFR for the primary secondary cell which trigger 2-STEP random access; the UE initiates 2-STEP random access when the RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; in response to determining that the trigger source is BFR for the primary cell and/or BFR for the primary secondary cell, the network configuration of the UE is obtained; in response to determining that the network configuration includes contention free random access resources for BFR, the type of the contention free random access resources for BFR is obtained; and 2-STEP random access is triggered based on the type of the contention free random access resources for beam recovery, as a result, when BFR for the primary cell is triggered and/or BFR for the primary secondary cell is triggered, 2-STEP random access is able to be triggered for beam recovery, and access delay is reduced and beam recovery is achieved.

As another possible implementation, as shown in FIG. 6, the random access method provided in the present disclosure includes the following steps:

S601, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by UE in a connected state; while small data transmission is triggered by User Equipment (UE) in an inactive state.

S602, in response to determining that the trigger source is beam failure recovery BFR for a primary cell and/or beam failure recovery BFR for a primary secondary cell, obtaining a network configuration of UE.

In the present disclosure, the network configuration of the UE may include one or more of the following: allowance of triggering 2-STEP random access when BFR for the primary cell is triggered and/or BFR for the primary secondary cell is triggered, contention free random access resources used for BFR, etc.

S603, in response to determining that the network configuration includes allowance of triggering 2-STEP random access when BFR for the primary cell is triggered and/or BFR for the primary secondary cell is triggered and the network configuration includes contention free random access resources for BFR, obtaining the type of the contention free random access resources for BFR.

S604, triggering 2-STEP random access based on the type of the contention free random access resources for beam recovery.

A random access method is provided in the present disclosure. The method may be executed separately or in conjunction with other methods disclosed in the present disclosure. It should be noted that the random access method according to the present disclosure may be executed on UE. The method includes: determining the type of triggered random access based on the type of the contention free random access resources for BFR when the UE is able to initiate contention free random access. For example, when the type of the contention free random access resources for BFR is 2-STEP, 2-STEP random access is triggered for beam recovery; or, when the type of the contention free random access resources for BFR is 4-STEP, 4-STEP random access is triggered for beam recovery.

A random access method is provided in the present disclosure. The method may be executed separately or in conjunction with other methods disclosed in the present disclosure. It should be noted that the random access method according to the present disclosure may be executed on UE. The method includes: in response to determining that the type of the contention free random access resources for BFR is 2-STEP, the UE may also select the BWP which initiates random access from the contention free random access resources, and obtain RSRP for downlink path loss reference of the BWP; the UE obtains RSRP thresholds corresponding to BFR for the primary cell and/or BFR for the primary secondary cell which trigger 2-STEP random access; the UE initiates 2-STEP random access when the RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; in response to determining that the trigger source is BFR for the primary cell and/or BFR for the primary secondary cell, the network configuration of the UE is obtained; and in response to determining that the network configuration includes allowance of triggering 2-STEP random access when BFR for the primary cell is triggered and/or BFR for the primary secondary cell is triggered, and the network configuration includes contention free random access resources for BFR, the type of the contention free random access resources for BFR is obtained; and 2-STEP random access is triggered based on the type of the contention free random access resources for beam recovery, as a result, when BFR for the primary cell is triggered and/or BFR for the primary secondary cell is triggered, 2-STEP random access is able to be triggered for beam recovery, and access delay is reduced and beam recovery speed is improved.

As another possible implementation, as shown in FIG. 7, the random access method provided in the present disclosure includes the following steps:

S701, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by User Equipment (UE) in a connected state; while small data transmission is triggered by UE in an inactive state.

S702, in response to determining that the trigger source is regular buffer status report BSR, triggering 2-STEP random access to request the available uplink resources based on the absence of the available uplink resources or failure of present available uplink resources to meet logical channel prioritization (LCP) mapping restriction of the logical channel triggering the BSR.

In the present disclosure, there are two conditions that trigger regular BSR, and one of the two conditions needs to be met. The first condition is that new data arrives, the new data needs to be transmitted on a first-priority logical channel, but the priority of the UE's currently contained logical channel that may transmit data is lower than the first priority. The second condition is that new data arrives, but the UE does not contain a logical channel that may transmit data. Where the available uplink resources for transmitting regular BSR may be, for example, UL-SCH (Uplink Shared Channel) resources.

In the present disclosure, triggering the regular BSR includes at least one of the following: the network side is configured with a logical channel for 2-STEP random access; the network side is configured with a logical channel of HARQ with UL retransmission disabled; the network side is configured with a low-latency logical channel, where the logical channel is a traffic channel and/or a control channel; and the network side is configured to allow the UE to use 2-STEP random access.

In the present disclosure, in the first scenario, in response to determining that the trigger source is regular BSR and the regular BSR is triggered by the network side being configured with a logical channel for 2-STEP random access, the network side being configured with the logical channel of HARQ with UL retransmission disabled, or the network side being configured with the low-latency logical channel, 2-STEP random access is triggered to request available uplink resources based on the absence of the available uplink resources or failure of present available uplink resources to meet LCP mapping restriction of the logical channel triggering the BSR.

In the second scenario, in response to determining that the trigger source is regular BSR and the network side is configured to allow the UE to use 2-STEP random access, 2-STEP random access is triggered to request available uplink resources based on the absence of the available uplink resources or failure of present available uplink resources to meet LCP mapping restriction of the logical channel triggering the BSR. Where the logical channel is a traffic channel and/or a control channel.

In the present disclosure, after triggering 2-STEP random access, if there are a plurality of regular BSRs and the types of random access triggered by the plurality of regular BSRs are inconsistent, in the first case, one type may be selected from a plurality of types to initiate random access; or, in the second case, the regular BSR triggered by the logical channel with the highest priority is selected from the plurality of regular BSRs, and random access is initiated based on the type of random access triggered by the selected regular BSR. Where the two cases may be selected according to actual needs.

Where a network configuration of the UE may be activated or deactivated through media access control layer control element (MAC CE) or physical downlink control channel (PDCCH). That is to say, the network configuration of the UE may be activated through MAC CE or PDCCH, and then whether to trigger 2-STEP random access is determined in combination with the network configuration; it is also possible to deactivate the network configuration of the UE through MAC CE or PDCCH to avoid determining whether to trigger 2-STEP random access in combination with the network configuration.

A random access method is provided in the present disclosure. The method may be executed separately or in conjunction with other methods disclosed in the present disclosure. It should be noted that the random access method according to the present disclosure may be executed on UE. The method includes: after triggering 2-STEP random access, the UE may choose to initiate contention free random access or competitive random access. After selection of the type of random access to initiate, the BWP to initiate random access may also be selected; when the BWP is configured with 2-STEP random access resources, the UE initiates 2-STEP random access; or, when the BWP is not configured with 2-STEP random access resources, the UE initiates 4-STEP random access.

A random access method is provided in the present disclosure. The method may be executed separately or in conjunction with other methods disclosed in the present disclosure. It should be noted that the random access method according to the present disclosure may be executed on UE. The method includes: after triggering 2-STEP random access, the UE may choose to initiate contention free random access or competitive random access. After selection of the type of random access to initiate, the BWP to initiate random access may also be selected; when the BWP is configured with 2-STEP random access resources, the UE initiates 2-STEP random access. When the BWP is configured with the 2-STEP random access resources, the UE may first obtain reference signal received power RSRP for downlink path loss reference of the BWP; the UE obtains RSRP threshold corresponding to regular BSR which triggers 2-STEP random access; the UE initiates 2-STEP random access when the RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; 2-STEP random access is triggered to request available uplink resources based on the absence of the available uplink resources or failure of present available uplink resources to meet LCP mapping restriction of the logical channel triggering the BSR. As a result, when regular BSR is triggered, 2-STEP random access is able to be triggered to send the regular BSR, and access delay is reduced and regular BSR sending speed is improved.

As another possible implementation, as shown in FIG. 8, the random access method provided in the present disclosure includes the following steps:

S801, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by UE in a connected state; while small data transmission is triggered by UE in an inactive state.

S802, in response to determining that the trigger source is regular BSR, sending the regular BSR through available uplink resources based on presence of the available uplink resources and the present available uplink resources meeting LCP mapping restriction of the logical channel triggering the BSR.

In the present disclosure, the UE may send the regular BSR directly through available uplink resources to realize rapid sending of the regular BSR based on presence of the available uplink resources and the present available uplink resources meeting LCP mapping restriction of the logical channel triggering the BSR.

According to the random access method in the embodiments of the present disclosure, the trigger source for 2-STEP random access may be determined; in response to determining that the trigger source is regular BSR, the regular BSR is sent through available uplink resources to improve the regular BSR sending speed based on presence of the available uplink resources and the present available uplink resources meeting LCP mapping restriction of the logical channel triggering the BSR.

As another possible implementation, as shown in FIG. 9, the random access method provided in the present disclosure includes the following steps:

S901, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by UE in a connected state; while small data transmission is triggered by UE in an inactive state.

S902, in response to determining that the trigger source is an SR, triggering 2-STEP random access based on absence of scheduling request resources to obtain available uplink resources.

In the present disclosure, the trigger source for triggering an SR may be, for example, regular BSR or BFR.

In the present disclosure, the UE may obtain the trigger source for the SR based on absence of scheduling request resources; in response to determining that the trigger source for the SR is the regular BSR triggered by a 2-STEP random access logical channel configured on the network side, or the regular BSR triggered by the logical channel which uses HARQ with UL retransmission disabled and is configured on the network side, or BFR for a secondary cell, 2-STEP random access is triggered to request the available uplink resources; or, in response to determining that the trigger source for the SR is a trigger source other than the aforementioned trigger sources, 4-STEP random access is triggered to request the available uplink resources. Where scheduling request resources may be, for example, Physical Uplink Control Channel (PUCCH) resources.

Where in response to determining that the trigger source for the SR is the regular BSR triggered by a 2-STEP random access logical channel configured on the network side, or the regular BSR triggered by the logical channel which uses HARQ with UL retransmission disabled and is configured on the network side, or BFR for the secondary cell, the UE may trigger 2-STEP random access to request scheduling resources, and then send scheduling requests through scheduling requested resources to request available uplink resources; when the SR is triggered by regular BSR, the regular BSR is sent through the available uplink resources; and when the SR is triggered by BFR, beam recovery is realized through the available uplink resources.

Where a network configuration of the UE may be activated or deactivated through MAC CE or PDCCH. That is to say, the network configuration of the UE may be activated through MAC CE or PDCCH, and then whether to trigger 2-STEP random access is determined in combination with the network configuration; it is also possible to deactivate the network configuration of the UE through MAC CE or PDCCH to avoid determining whether to trigger 2-STEP random access in combination with the network configuration.

According to the random access method in the embodiments of the present disclosure, the trigger source for 2-STEP random access may be determined; in response to determining that the trigger source is an SR, 2-STEP random access is triggered to obtain available uplink resources based on absence of scheduling request. As a result, when the SR is triggered, 2-STEP random access is able to be triggered to send the SR to obtain available uplink resources, and access delay is reduced, and the SR sending speed and available uplink resource requesting speed are improved.

As another possible implementation, as shown in FIG. 10, the random access method provided in the present disclosure includes the following steps:

S1001, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by UE in a connected state; while small data transmission is triggered by UE in an inactive state.

S1002, in response to determining that the trigger source is an SR, requesting available uplink resources through scheduling request resources based on presence of the scheduling request resources.

In the present disclosure, the trigger source for triggering an SR may be, for example, regular BSR or BFR.

In the present disclosure, based on the presence of scheduling request resources, the UE may send an SR through the scheduling request resources to request the available uplink resources, and when the SR is triggered by regular BSR, the regular BSR is sent through the available uplink resources; and when the SR is triggered by BFR, beam recovery is realized through the available uplink resources. Where scheduling request resources may be, for example, Physical Uplink Control Channel (PUCCH) resources.

According to the random access method in the embodiments of the present disclosure, the trigger source for 2-STEP random access may be determined; in response to determining that the trigger source is an SR, available uplink resources are requested through scheduling request resources based on presence of the scheduling request resources. As a result, when the SR is triggered and the scheduling request resources are present, the available uplink resources are able to be requested through the scheduling request resources, and access delay is reduced and available uplink resource requesting speed is improved.

As another possible implementation, as shown in FIG. 11, the random access method provided in the present disclosure includes the following steps:

S1101, determining a trigger source for 2-STEP random access.

In the present disclosure, the trigger source for 2-STEP random access is, for example, Beam Failure Recovery (BFR), Buffer Status Report, Scheduling Request (SR), small data transmission, etc. Where BFR, BSR and SR are triggered by User Equipment (UE) in a connected state; while small data transmission is triggered by UE in an inactive state.

S1102, in response to determining that the trigger source is small data transmission, obtaining DRB that triggers the small data transmission.

In the present disclosure, the network side configured with the DRB for small data transmission, if the data volume reaches or exceeds a threshold, an Radio Resource Control (RRC) layer of the UE instructs the MAC layer to transmit small data, thus triggering small data transmission.

In the present disclosure, when instructing the MAC layer to transmit the small data, the RRC layer may further indicate whether to use random access or configured grant for small data transmission. For example, if configured grant resources are not included in the network configuration of the UE, or although the configured grant resources are included but they do not meet the LCP mapping restriction of the logical channel corresponding to DRB, the RRC layer instructs the MAC layer to use random access for small data transmission. Additionally, if it is indicated to use random access for small data transmission, it may be further indicated whether to use 2-STEP random access for small data transmission.

S1103, in response to determining that a network configuration of user equipment includes the DRB or the logical channel corresponding to the DRB is configured with 2-STEP random access or HARQ with UL retransmission disabled, triggering 2-STEP random access to transmit small data.

In the present disclosure, under the condition of a plurality of DRBs triggering the small data transmission, the DRB with a highest priority may be obtained; and when the network configuration of the UE includes the DRB with the highest priority or the logical channel corresponding to the DRB with the highest priority configured with 2-STEP random access resources or HARQ with UL retransmission disabled, 2-STEP random access is triggered to transmit small data.

A random access method is provided in the present disclosure. The method may be executed separately or in conjunction with other methods disclosed in the present disclosure. It should be noted that the random access method according to the present disclosure may be executed on UE. The method includes: after triggering 2-STEP random access, the UE may choose to initiate contention free random access or competitive random access. After selection of the type of random access to initiate, the BWP to initiate random access may also be selected; when the BWP is configured with 2-STEP random access resources, the UE initiates 2-STEP random access; or, when the BWP is not configured with 2-STEP random access resources, the UE initiates 4-STEP random access.

A random access method is provided in the present disclosure. The method may be executed separately or in conjunction with other methods disclosed in the present disclosure. It should be noted that the random access method according to the present disclosure may be executed on UE. The method includes: in response to determining that the BWP is configured with the 2-STEP random access resources, the UE may first obtain RSRP for downlink path loss reference of the BWP; the UE obtains RSRP threshold corresponding to small data transmission which triggers 2-STEP random access; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; in response to determining that the trigger source is small data transmission, DRB that triggers the small data transmission is obtained; and in response to determining that the network configuration of the UE includes the DRB or the logical channel corresponding to the DRB configured with 2-STEP random access or HARQ with UL retransmission disabled, 2-STEP random access is triggered to transmit small data. As a result, when small data transmission is triggered, 2-STEP random access is able to be triggered to transmit the small data, and access delay is reduced and small data transmission speed is improved.

As another possible implementation, as shown in FIG. 12, the random access method provided in the present disclosure includes the following steps:

S1201, determining a trigger source for 2-STEP random access.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by User Equipment (UE) in a connected state; while small data transmission is triggered by UE in an inactive state.

S1202, in response to determining that the trigger source is small data transmission, obtaining a network configuration of user equipment.

In the present disclosure, small data transmission generally refers to the small data transmission that needs to be carried out when the UE is in an inactive state.

S1203, in response to determining that the network configuration includes allowance of the user equipment to trigger 2-STEP random access in inactive state, triggering 2-STEP random access to transmit the small data.

In the present disclosure, in response to determining that the network configuration does not include allowance of the UE to trigger 2-STEP random access in inactive state, the UE may also trigger 4-STEP random access to transmit the small data.

In the present disclosure, the situation where the UE in an inactive state triggers random access may include one or more of the following: random access triggered by small data transmission, and random access triggered by non-small data transmission. Where random access triggered by non-small data transmission is, for example, SI request triggered random access, RRC layer triggered random access, etc.

That is to say, in the present disclosure, in response to determining that the trigger source is an SI request or the trigger source is an RRC layer, the UE may also trigger 2-STEP random access based on the network configuration including allowance of the UE to trigger 2-STEP random access in inactive state.

A random access method is provided in the present disclosure. The method may be executed separately or in conjunction with other methods disclosed in the present disclosure. It should be noted that the random access method according to the present disclosure may be executed on UE. The method includes: after triggering 2-STEP random access, the UE may choose to initiate contention free random access or competitive random access. After selection of the type of random access to initiate, the BWP to initiate random access may also be selected; when the BWP is configured with 2-STEP random access resources, the UE initiates 2-STEP random access; or, when the BWP is not configured with 2-STEP random access resources, the UE initiates 4-STEP random access.

A random access method is provided in the present disclosure. The method may be executed separately or in conjunction with other methods disclosed in the present disclosure. It should be noted that the random access method according to the present disclosure may be executed on UE. The method includes: in response to determining that the BWP is configured with the 2-STEP random access resources, the UE may first obtain RSRP for downlink path loss reference of the BWP; the UE obtains RSRP threshold corresponding to small data transmission which triggers 2-STEP random access; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

According to the random access method in the embodiments of the present disclosure, the trigger source for 2-STEP random access may be determined; in response to determining that the trigger source is small data transmission, the network configuration of the UE is obtained; and in response to determining that the network configuration includes allowance of the UE to trigger 2-STEP random access in inactive state, 2-STEP random access is triggered to transmit the small data. As a result, when small data transmission is triggered, 2-STEP random access is able to be triggered to transmit the small data, access delay is reduced and small data transmission speed is improved.

FIG. 13 is a schematic diagram of a random access method provided in the present disclosure. It should be noted that the random access method according to the present disclosure may be executed on the network side device corresponding to the UE. Where the network side device is, for example, a base station, satellite, etc.

As shown in FIG. 13, the random access method provided in the present disclosure includes the following steps:

S1301, receiving a 2-STEP random access request sent by user equipment, where the 2-STEP random access request is initiated by the user equipment based on a trigger source.

In the present disclosure, the trigger source for 2-STEP random access is, for example, Beam Failure Recovery (BFR), Buffer Status Report (BSR), Scheduling Request (SR), small data transmission, etc. Where BFR, BSR and SR are triggered by User Equipment (UE) in a connected state; while small data transmission is triggered by UE in an inactive state.

In the present disclosure, there are two types of random access: 4-STEP random access and 2-STEP random access. 4-STEP random access includes 4 steps. Step 1: UE sends Random Access Preamble to a base station; Step 2: the base station returns Random Access Response to the UE; Step 3: the UE sends Scheduled Transmission to the base station; Step 4, the base station returns Content Resolution to the UE. 2-STEP random access includes 2 steps. Step 1 is MsgA, which is equivalent to the Step 1+Step 3 of 4-STEP random access; Step 2 is MsgB, which is equivalent to the Step 2+Step 4 of 4-STEP random access.

In the present disclosure, after triggering 2-STEP random access based on the trigger source, the UE may select the BWP to initiate random access; in response to determining that the BWP is configured with 2-STEP random access resources, the UE initiates 2-STEP random access; or, in response to determining that BWP is not configured with 2-STEP random access resources, the UE initiates 4-STEP random access.

In the present disclosure, when the BWP is configured with the 2-STEP random access resources, the UE may first obtain RSRP for downlink path loss reference of the BWP; the UE obtains RSRP threshold corresponding to the trigger source which triggers 2-STEP random access; where different triggering sources correspond to different RSRP thresholds; the UE initiates 2-STEP random access when RSRP is greater than or equal to the RSRP threshold; and when RSRP is less than the RSRP threshold, the UE initiates 4-STEP random access. Where the RSRP threshold here is different from msgA-RSRP-Threshold.

In the present disclosure, in an example, the 2-STEP random access request is: a 2-STEP random access request sent by the UE in response to determining that the trigger source is BFR for a secondary cell and there are no available uplink resources for requesting the available uplink resources.

Where the available uplink resources may include at least one of the following: available uplink resources for sending BFR MAC CE; available uplink resources for sending truncated BFR MAC CE; and available uplink resources with UL retransmission of the corresponding HARQ not disabled.

In the present disclosure, in an example, the 2-STEP random access request is a 2-STEP random access request sent by the UE for beam recovery; where in response to determining that the trigger source is BFR for a primary cell and/or BFR for a primary secondary cell, the network configuration of the UE is obtained; and in response to determining that the network configuration includes allowance of triggering 2-STEP random access when BFR for the primary cell is triggered and/or BFR for the primary secondary cell is triggered, the UE sends the 2-STEP random access request for beam recovery.

Where the 2-STEP random access request sent by the UE may be: in response to determining that the network configuration includes contention free random access resources for BFR, the UE obtaining the type of the contention free random access resources for BFR; and the UE sending the 2-STEP random access request for beam recovery based on the type of the contention free random access resources.

Where the 2-STEP random access request sent by the UE may be: in response to determining that the network configuration includes allowance of triggering 2-STEP random access when BFR for the primary cell is triggered and/or BFR for the primary secondary cell is triggered, and the network configuration includes the contention free random access resources for BFR, the UE obtaining the type of the contention free random access resources for BFR; and the UE sending the 2-STEP random access request for beam recovery based on the type of the contention free random access resources.

In the present disclosure, in an example, the 2-STEP random access request is a 2-STEP random access request sent by the UE for requesting available uplink resources; Where in response to determining that the trigger source is a regular BSR and there are no the available uplink resources or present available uplink resources are failed to meet LCP mapping restriction of the logical channel triggering the BSR, the UE triggers 2-STEP random access to request the available uplink resources.

Where triggering the regular BSR may include at least one of the following: the network side being configured with a 2-STEP random access logical channel; the network side being configured with a logical channel of HARQ with UL retransmission disabled; the network side being configured with a low-latency logical channel, where the logical channel is a traffic channel and/or a control channel; and the network side is configured to allow the UE to use 2-STEP random access.

Where in response to determining that there are a plurality of regular BSRs and the types of random access triggered by the plurality of regular BSRs are different, the UE may select one type from a plurality of types to initiate random access; or, in response to determining that there are a plurality of regular BSRs and the types of random access triggered by the plurality of regular BSRs are different, the UE may select the regular BSR triggered by the logical channel with the highest priority from the plurality of regular BSRs and initiate random access based on the type of random access triggered by the selected regular BSR.

Where the network side device may activate or deactivate the network configuration of the UE through media access control layer control element (MAC CE) or physical downlink control channel (PDCCH).

In the present disclosure, in an example, the 2-STEP random access request is: a 2-STEP random access request sent by the UE in response to determining that the trigger source is SR and there are no scheduling request resources for requesting available uplink resources.

Where in response to determining that the trigger source is SR and there are no scheduling request resources, the UE may obtain the trigger source for the SR; and in response to determining that the trigger source for the SR is the regular BSR triggered by a 2-STEP random access logical channel configured on the network side, or the regular BSR triggered by the logical channel which uses HARQ with UL retransmission disabled and is configured on the network side, or BFR for the secondary cell, the UE triggers 2-STEP random access to request the available uplink resources.

Where in response to determining that there are no the scheduling request resources, the UE may obtain the network configuration of the UE; and in response to determining that the network configuration includes allowance of the SR to trigger 2-STEP random access, the UE triggers 2-STEP random access to obtain the available uplink resources.

Where the network side device may activate or deactivate the network configuration of the UE through media access control layer control element (MAC CE) or physical downlink control channel (PDCCH).

In the present disclosure, in an example, the 2-STEP random access request is a 2-STEP random access request sent by the UE and used for transmitting small data; where in response to determining that the trigger source is small data transmission, the UE obtains DRB that triggers the small data transmission; and in response to determining that the network configuration of the UE includes the DRB or the logical channel corresponding to the DRB is configured with 2-STEP random access or HARQ with UL retransmission disabled, the UE triggers 2-STEP random access to transmit small data.

Where in response to determining that there are a plurality of DRBs triggering the small data transmission, the UE may obtain the DRB with the highest priority; and in response to determining that the network configuration of the UE includes the DRB with the highest priority or the logical channel corresponding to the DRB with the highest priority is configured with 2-STEP random access or HARQ with UL retransmission disabled, the UE triggers 2-STEP random access to transmit the small data.

In the present disclosure, in an example, the 2-STEP random access request is: a 2-STEP random access request sent by the UE for small data transmission in response to determining that the trigger source is small data transmission and the network configuration of the UE includes allowance of the UE to trigger 2-STEP random access in inactive state.

In the present disclosure, in an example, the 2-STEP random access request is: a 2-STEP random access request initiated by the UE in response to determining that BWP selected to initiate random access is not configured with 2-STEP random access resources.

In the present disclosure, in an example, the network side device may further receive a 4-STEP random access request initiated by the UE; where the 4-STEP random access request is a 4-STEP random access request initiated by the UE in response to determining that BWP selected to initiate random access is not configured with 2-STEP random access resources.

It should be noted that in the present disclosure, the detailed description of the UE initiating a 2-STEP random access request or a 4-STEP random access request may be referred to the embodiments shown in FIG. 1 to FIG. 12, and will not be described in detail here.

According to the random access method in the embodiments of the present disclosure, it is possible to receive a 2-STEP random access request sent by the UE; where the 2-STEP random access request is initiated by the UE based on the trigger source, as a result, 2-STEP random access is able to be triggered based on the trigger source for 2-STEP random access, interaction steps and access delay are reduced.

By corresponding to the random access method provided by the above embodiments, the present disclosure further provides a random access apparatus, and the random access apparatus provided by the embodiments of the present disclosure corresponds to the random access method provided in the above embodiments, as a result, the implementation manners in the random access method are also applicable to the random access apparatus provided in this embodiment, and will not be described in detail in this embodiment. FIG. 14-21 are a schematic structural diagrams of a random access apparatus provided in the present disclosure.

FIG. 14 is a schematic structural diagram of a random access apparatus provided in the present disclosure. The apparatus is applied to the UE.

As shown in FIG. 14, the random access apparatus 1000 includes a determining module 100 and a triggering module 200. Where the determining module 100 is configured to determine a trigger source for 2-STEP random access; the triggering module 200 is configured to trigger 2-STEP random access correspondingly based on the trigger source for 2-STEP random access.

In the present disclosure, the random access apparatus 1000 may further include: an obtaining module, configured to obtain the BWP selected by the UE to initiate random access;

and an initiating module, configured to initiate 2-STEP random access in response to determining that the BWP is configured with 2-STEP random access resources; or, in response to determining that the BWP is not configured with 2-STEP random access resources, initiate 4-STEP random access.

In the present disclosure, the initiating module is specifically configured to, in response to determining that the BWP is configured with 2-STEP random access resources, obtain RSRP for downlink path loss reference of the BWP; obtain RSRP threshold corresponding to the trigger source which triggers 2-STEP random access; and initiate 2-STEP random access in response to determining that the RSRP is greater than or equal to the RSRP threshold.

According to the random access apparatus in the embodiments of the present disclosure, the trigger source for 2-STEP random access may be determined; according to the trigger source for 2-STEP random access, 2-STEP random access may be triggered. As a result, 2-STEP random access is able to be triggered based on the trigger source for 2-STEP random access, interaction steps and access delay are reduced.

In the embodiments of the present disclosure, as shown in FIG. 15, the triggering module 200 in FIG. 14 includes: a first triggering unit 210;

where the first triggering unit 210 is configured to: in response to determining that the trigger source is BFR for a secondary cell, trigger 2-STEP random access to request available uplink resources based on the absence of the available uplink resources.

In an example, the triggering module 200 may also include: a first processing unit 220, configured to achieve beam recovery through the available uplink resources based on the presence of the available uplink resources.

In the present disclosure, the available uplink resources include at least one of the following: available uplink resources for sending BFR MAC CE; available uplink resources for sending truncated BFR MAC CE; and available uplink resources with UL retransmission of the corresponding HARQ not disabled.

According to the random access apparatus in the embodiments of the present disclosure, the trigger source for 2-STEP random access may be determined; in response to determining that the trigger source is BFR for the secondary cell, 2-STEP random access is triggered to request available uplink resources based on absence of the available uplink resources. As a result, when the BFR for the secondary cell is triggered, 2-STEP random access is able to be triggered to send BFR MAC CE, and access delay is reduced and improving beam recovery speed is improved.

In the embodiments of the present disclosure, as shown in FIG. 16, the triggering module 200 in FIG. 14 includes: a first obtaining unit 230 and a second triggering unit 240;

where the first obtaining unit 230 is configured to obtain a network configuration of UE in response to determining that the trigger source is BFR for a primary cell and/or BFR for a primary secondary cell; and the second triggering unit 240 is configured to trigger 2-STEP random access for beam recovery in response to determining that the network configuration includes allowance of triggering 2-STEP random access when BFR for the primary cell is triggered and/or BFR for the primary secondary cell is triggered.

In the present disclosure, in an example, the first obtaining unit 230 is further configured to: obtain the network configuration of UE in response to determining that the network configuration includes contention free random access resources for BFR; and the second triggering unit 240 is further configured to trigger 2-STEP random access based on the type of the contention free random access resources for beam recovery.

In the present disclosure, in an example, the first obtaining unit 230 is further configured to: in response to determining that the network configuration includes allowance of triggering 2-STEP random access when BFR for the primary cell is triggered and/or BFR for the primary secondary cell is triggered and includes the contention free random access resources for BFR, obtain the type of the contention free random access resources for BFR; and the second triggering unit 240 is further configured to trigger 2-STEP random access based on the type of the contention free random access resources for beam recovery.

According to the random access apparatus in the embodiments of the present disclosure, the trigger source for 2-STEP random access may be determined; in response to determining that the trigger source is BFR for the primary cell and/or BFR for the primary secondary cell, the network configuration of the UE is obtained; and in response to determining that the network configuration includes allowance of triggering 2-STEP random access when BFR for the primary cell is triggered and/or BFR for the primary secondary cell is triggered, 2-STEP random access is triggered for beam recovery, as a result, when BFR for the primary cell is triggered and/or BFR for the primary secondary cell is triggered, 2-STEP random access is able to be triggered for beam recovery, and access delay is reduced and beam recovery is improved.

Figure 17:
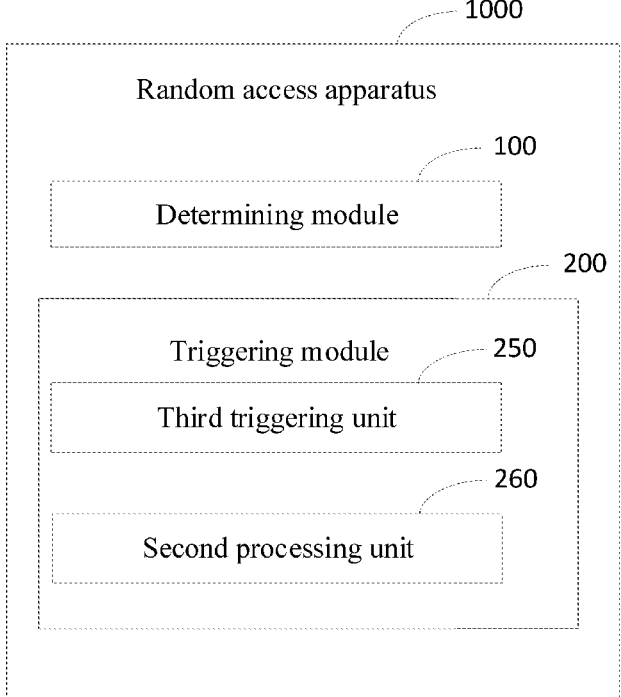
FIG. 17 is a schematic structural diagram of another random access apparatus according to an embodiment of the present disclosure.

In the embodiments of the present disclosure, as shown in FIG. 17, the triggering module 200 in FIG. 14 includes: a third triggering unit 250;

where the third triggering unit 250 is configured to trigger 2-STEP random access to request the available uplink resources in response to determining that the trigger source is regular BSR based on the absence of the available uplink resources or failure of present available uplink resources to meet LCP mapping restriction of the logical channel triggering the BSR.

In an example, the triggering module 200 includes: a second processing unit 260, which sends the regular BSR through the available uplink resources based on presence of the available uplink resources and the present available uplink resources meeting LCP mapping restriction of the logical channel triggering the BSR.

In the present disclosure, triggering the regular BSR includes at least one of the following: the network side is configured with a logical channel for 2-STEP random access; the network side is configured with a logical channel of HARQ with UL retransmission disabled; the network side is configured with a low-latency logical channel, where the logical channel is a traffic channel and/or a control channel; and the network side is configured to allow the UE to use 2-STEP random access.

In the present disclosure, the triggering module further includes: a selecting unit, configured to:

in response to determining that there are a plurality of regular BSRs and the types of random access triggered by the plurality of regular BSRs are different, select one type from a plurality of types to initiate random access; or, in response to determining that there are a plurality of regular BSRs and the types of random access triggered by the plurality of regular BSRs are different, select the regular BSR triggered by the logical channel with the highest priority from the plurality of regular BSRs, and initiate random access based on the random access type triggered by the selected regular BSR.

In the present disclosure, the network configuration of the UE is activated or deactivated through MAC CE or PDCCH.

According to the random access apparatus in the embodiments of the present disclosure, the trigger source for 2-STEP random access may be determined; 2-STEP random access is triggered to request available uplink resources based on the absence of the available uplink resources or failure of present available uplink resources to meet LCP mapping restriction of the logical channel triggering the BSR. As a result, when regular BSR is triggered, 2-STEP random access is able to be triggered to send the regular BSR, and access delay is reduced and regular BSR sending speed is improved.

Figure 18:
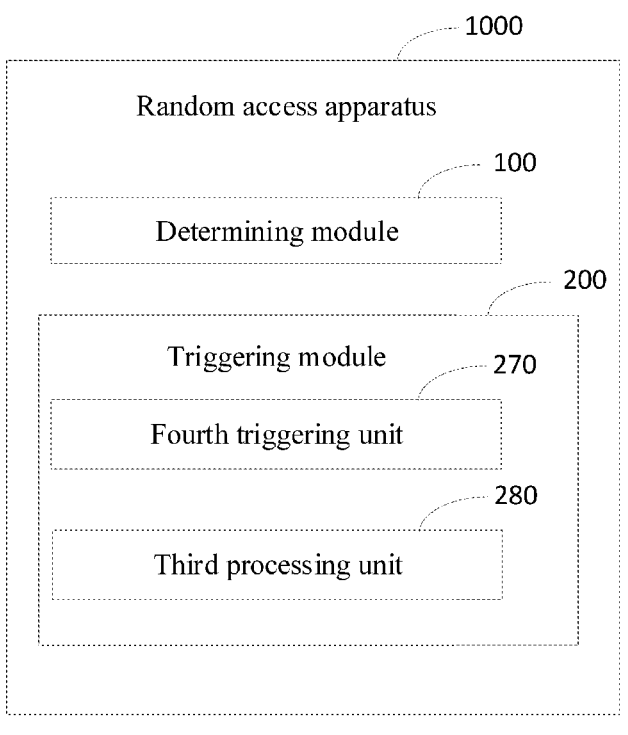
FIG. 18 is a schematic structural diagram of another random access apparatus according to an embodiment of the present disclosure.

In the embodiments of the present disclosure, as shown in FIG. 18, the triggering module 200 in FIG. 14 includes: a fourth triggering unit 270;

where the fourth triggering unit 270 is configured to trigger 2-STEP random access to request available uplink resources in response to determining that the trigger source is an SR based on absence of scheduling request resources.

In an example, the triggering module 200 further includes: a third processing unit 280, configured to request the available uplink resources through scheduling request resources based on presence of the scheduling request resources.

In the present disclosure, the fourth triggering unit 270 is specifically configured to: obtain the trigger source for the SR based on absence of the scheduling request resources; in response to determining that the trigger source for the SR is the regular BSR triggered by a 2-STEP random access logical channel configured on the network side, or the regular BSR triggered by the logical channel which uses HARQ with UL retransmission disabled and is configured on the network side, or BFR for a secondary cell, trigger 2-STEP random access to request the available uplink resources.

In the present disclosure, the fourth triggering unit 270 is specifically configured to: obtain a network configuration of the UE based on absence of the scheduling request resources; and in response to determining that the network configuration includes allowance of the SR to trigger 2-STEP random access, trigger 2-STEP random access to obtain the available uplink resources.

In the present disclosure, the network configuration of the UE is activated or deactivated through MAC CE or PDCCH.

According to the random access apparatus in the embodiments of the present disclosure, the trigger source for 2-STEP random access may be determined; in response to determining that the trigger source is an SR, available uplink resources are requested through scheduling request resources based on presence of the scheduling request resources. As a result, when the SR is triggered and the scheduling request resources are present, the available uplink resources are able to be requested through the scheduling request resources, and access delay is reduced and available uplink resource requesting speed is improved.

Figure 19:
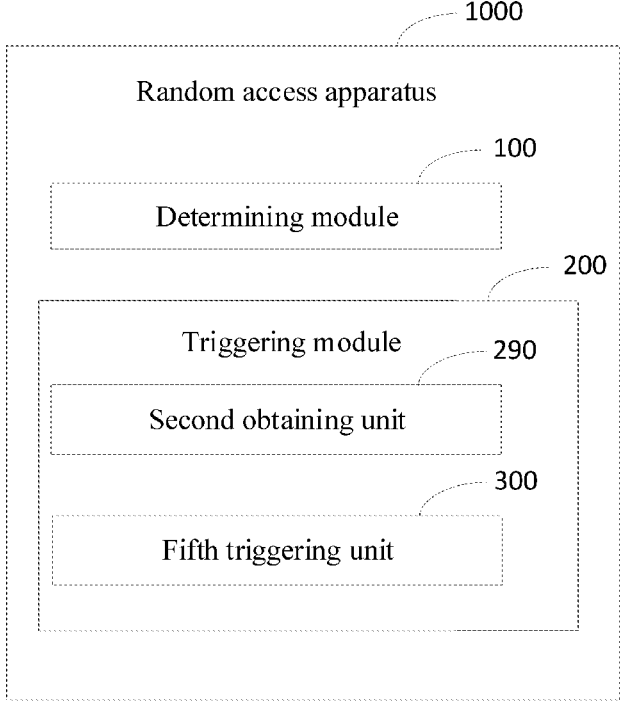
FIG. 19 is a schematic structural diagram of another random access apparatus according to an embodiment of the present disclosure.

In the embodiments of the present disclosure, as shown in FIG. 19, the triggering module 200 in FIG. 14 includes: a second obtaining unit 290 and a fifth triggering unit 300;

where the second obtaining unit 290 is configured to obtain DRB that triggers the small data transmission in response to determining that the trigger source is small data transmission; and the fifth triggering unit 300 is configured to trigger 2-STEP random access to transmit small data in response to determining that a network configuration of the UE includes the DRB or the logical channel corresponding to the DRB is configured with 2-STEP random access or HARQ with UL retransmission disabled.

In the present disclosure, the fifth triggering unit 300 is specifically configured to:

in response to determining that there are a plurality of DRBs triggering the small data transmission, obtain the DRB with a highest priority; and.

in response to determining that the network configuration of the UE includes the DRB with the highest priority or the logical channel corresponding to the DRB with the highest priority is configured with 2-STEP random access or HARQ with UL retransmission disabled, trigger 2-STEP random access to transmit small data.

According to the random access apparatus in the embodiments of the present disclosure, the trigger source for 2-STEP random access may be determined; in response to determining that the trigger source is small data transmission, DRB that triggers the small data transmission is obtained; and in response to determining that the network configuration of the UE includes the DRB or the logical channel corresponding to the DRB configured with 2-STEP random access or HARQ with UL retransmission disabled, 2-STEP random access is triggered to transmit small data. As a result, when small data transmission is triggered, 2-STEP random access is able to be triggered to transmit the small data, and access delay is reduced and small data transmission speed is improved.

Figure 20:
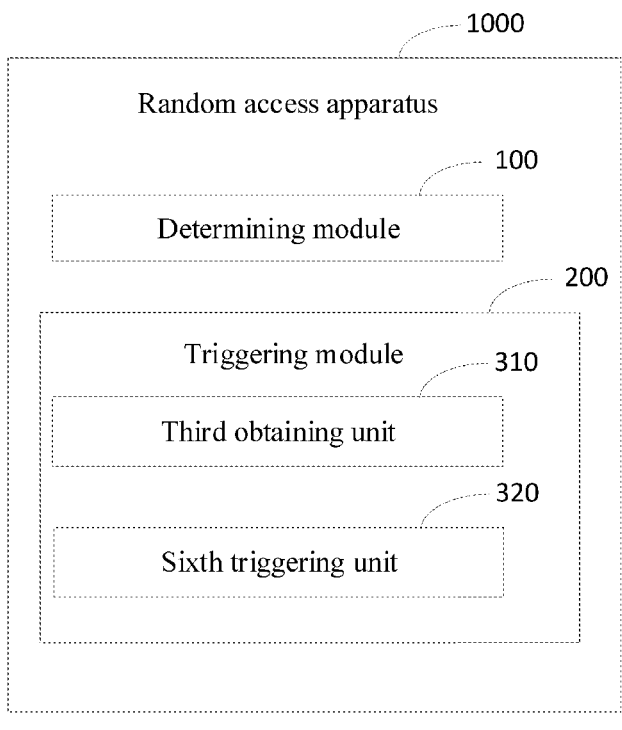
FIG. 20 is a schematic structural diagram of another random access apparatus according to an embodiment of the present disclosure.

In the embodiments of the present disclosure, as shown in FIG. 20, the triggering module 200 in FIG. 14 includes: a third obtaining unit 310 and a sixth triggering unit 320;

where the third obtaining unit 310 is configured to obtain a network configuration of UE in response to determining that the trigger source is small data transmission; and the sixth triggering unit 320 is configured to trigger 2-STEP random access to transmit the small data in response to determining that the network configuration includes allowance of the UE to trigger 2-STEP random access in inactive state.

According to the random access apparatus in the embodiments of the present disclosure, the trigger source for 2-STEP random access may be determined; in response to determining that the trigger source is small data transmission, the network configuration of the UE is obtained; and in response to determining that the network configuration includes allowance of the UE to trigger 2-STEP random access in inactive state, 2-STEP random access is triggered to transmit the small data. As a result, when small data transmission is triggered, 2-STEP random access is able to be triggered to transmit the small data, and access delay is reduced and small data transmission speed is improved.

Figure 21:
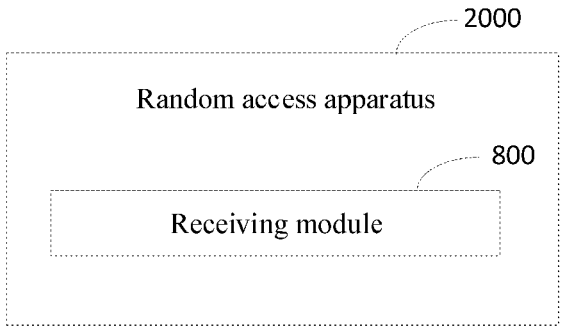
FIG. 21 is a schematic structural diagram of another random access apparatus according to an embodiment of the present disclosure.

FIG. 21 is a schematic structural diagram of a random access apparatus provided in the present disclosure. The apparatus is applied to the network side device corresponding to the UE, such as a base station, satellite, etc.

As shown in FIG. 21, the random access apparatus 2000 includes: a receiving module 800, configured to receive a 2-STEP random access request sent by UE; where the 2-STEP random access request is initiated by the UE based on a trigger source.

In the present disclosure, the receiving module 800 is further configured to receive a 4-STEP random access request initiated by the UE, where the 4-STEP random access request is a 4-STEP random access request initiated by the UE in response to determining that BWP selected to initiate random access is not configured with 2-STEP random access resources.

In the present disclosure, in an example, the 2-STEP random access request is: a 2-STEP random access request configured to request available uplink resources and sent by the UE in response to determining that the trigger source is BFR for a secondary cell and there are no the available uplink resources.

Where the available uplink resources may include at least one of the following: available uplink resources for sending BFR MAC CE; available uplink resources for sending truncated BFR MAC CE; and available uplink resources with UL retransmission of the corresponding HARQ not disabled.

In the present disclosure, in an example, the 2-STEP random access request is a 2-STEP random access request sent by the UE for beam recovery; where a network configuration of the user equipment is obtained by the user equipment in response to determining that the trigger source is beam failure recovery BFR for a primary cell and/or beam failure recovery BFR for a primary secondary cell; and 2-STEP random access request is sent by the user equipment for beam recovery in response to determining that the network configuration includes allowance of triggering 2-STEP random access when BFR for the primary cell is triggered and/or BFR for the primary secondary cell is triggered.

Where the 2-STEP random access request sent by the UE may be: a 2-STEP random access request for beam recovery, which is sent by the user equipment in following manner: in response to determining that the network configuration includes contention free random access resources for BFR, obtaining a type of the contention free random access resources for BFR; sending the 2-STEP random access request based on the type of the contention free random access resources for BFR.

Where the 2-STEP random access request sent by the UE may be: a 2-STEP random access request for beam recovery, which is sent by the user equipment in following manner: in response to determining that the network configuration includes allowance of triggering 2-STEP random access when BFR for the primary cell is triggered and/or BFR for the primary secondary cell is triggered, triggering the 2-STEP random access; in response to determining that the network configuration includes contention free random access resources for BFR, obtaining a type of the contention free random access resources for BFR; sending the 2-STEP random access request based on the type of the contention free random access resources for BFR.

In the present disclosure, in an example, the 2-STEP random access request is a 2-STEP random access request sent by the UE for requesting available uplink resources; where the 2-STEP random access is triggered to request available uplink resources by the user equipment in response to determining that the trigger source is a regular buffer status report BSR, and there are no the available uplink resources or present available uplink resources to meet LCP mapping restriction of the logical channel triggering the BSR.

Where triggering the regular BSR may include at least one of the following: the network side being configured with a 2-STEP random access logical channel; the network side being configured with a logical channel of HARQ with UL retransmission disabled; the network side being configured with a low-latency logical channel, where the logical channel is a traffic channel and/or a control channel; and the network side being configured to allow the UE to use 2-STEP random access.

Where in response to determining that there are a plurality of regular BSRs and the types of random access triggered by the plurality of regular BSRs are different, the UE may select one type from a plurality of types to initiate random access; or, in response to determining that there are a plurality of regular BSRs and the types of random access triggered by the plurality of regular BSRs are different, the UE may select the regular BSR triggered by the logical channel with the highest priority from the plurality of regular BSRs and initiate random access based on the type of random access triggered by the selected regular BSR.

Where the network side device may activate or deactivate the network configuration of the UE through MAC CE or PDCCH.

In the present disclosure, in an example, the 2-STEP random access request is: a 2-STEP random access request for requesting available uplink resources, which is sent by the user equipment in response to determining that the trigger source is a scheduling request SR and there are no scheduling request resources.

Where in response to determining that the trigger source is SR and there are no scheduling request resources, the user equipment obtains the trigger source for the SR; and in response to determining that the trigger source for the SR is the regular buffer status report BSR triggered by a logical channel for 2-STEP random access configured on the network side, or the regular BSR triggered by a logical channel which uses hybrid automatic repeat request HARQ with UL retransmission disabled and is configured on the network side, or beam failure recovery BFR for the secondary cell, the user equipment triggers 2-STEP random access to request the available uplink resources.

Where in response to determining that there are no scheduling request resources, the user equipment obtains the network configuration of user equipment; and in response to determining that the network configuration includes allowance of the SR to trigger 2-STEP random access, the user equipment triggers 2-STEP random access to obtain the available uplink resources.

Where the network side device may activate or deactivate the network configuration of the UE through MAC CE or PDCCH.

In the present disclosure, in an example, the 2-STEP random access request is a 2-STEP random access request sent by the UE for transmitting small data; where data radio bearer DRB that triggers small data transmission is obtained by the user equipment in response to determining that the trigger source is the small data transmission; and 2-STEP random access is triggered to transmit the small data by the user equipment in response to determining that network configuration of the user equipment includes the DRB or the logical channel corresponding to the DRB being configured with 2-STEP random access or hybrid automatic repeat request HARQ with UL retransmission disabled.

Where in response to determining that there are a plurality of DRBs triggering the small data transmission, the user equipment obtains the DRB with the highest priority; and in response to determining that the network configuration of the user equipment includes the DRB with the highest priority or the logical channel corresponding to the DRB with the highest priority being configured with 2-STEP random access or hybrid automatic repeat request HARQ with UL retransmission disabled, the user equipment triggers 2-STEP random access to transmit the small data.

In the present disclosure, in an example, the 2-STEP random access request is: a 2-STEP random access request for small data transmission, which is sent by the user equipment in response to determining that the trigger source is small data transmission and the network configuration of the user equipment includes allowance of the user equipment to trigger 2-STEP random access in inactive state.

In the present disclosure, in an example, the 2-STEP random access request is: a 2-STEP random access request initiated by the user equipment in response to determining that bandwidth part BWP selected to initiate random access is configured with 2-STEP random access resources.

In the present disclosure, in an example, the network side device may further receive a 4-STEP random access request initiated by the UE; where the 4-STEP random access request is a 4-STEP random access request initiated by the UE in response to determining that bandwidth part BWP selected to initiate random access is not configured with 2-STEP random access resources.

It should be noted that in the present disclosure, the detailed description of the UE initiating a 2-STEP random access request or a 4-STEP random access request may be referred to the embodiments shown in FIG. 1 to FIG. 12, and will not be described in detail here.

According to the embodiments of the present disclosure, the present disclosure further provides an electronic device and a readable storage medium.

Figure 22:
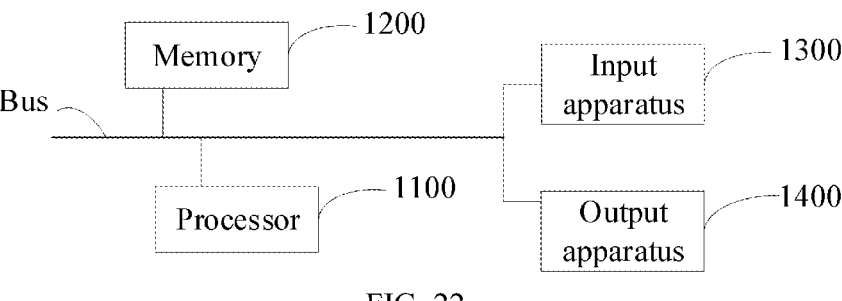
FIG. 22 is a schematic diagram of an electronic device provided by an embodiment of the present disclosure.

As shown in FIG. 22, it is a block diagram of an electronic device used for random access according to embodiments of the present disclosure. The electronic device is intended to represent digital computers in various forms, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 22, the electronic device includes: one or more processors 1100, a memory 1200 and interfaces configured to connect various components and including a high-speed interface and a low-speed interface. The components are connected with each other by virtue of different buses, and may be installed on a common motherboard or may be installed in other manners as needed. The processor may process instructions executed within the electronic device, including instructions stored in the memory or on the memory to display graphical information of a GUI on an external input/output apparatus (such as a display device coupled to an interface). In other implementation manners, a plurality of the processors and/or a plurality of the buses may be used together with a plurality of the memories and a plurality of the memories as needed. Similarly, a plurality of the electronic devices may be connected, and each device provides part of necessary operations (such as serving as a server array, a set of blade servers, or a multi-processor system). In FIG. 22, one processor 1100 is taken as an example.

The memory 1200 is a non-transitory computer readable storage medium provided by the present disclosure. Where instructions that may be executed by at least one processor are stored in the memory, so that the at least one processor executes the random access method provided by the present disclosure. The non-transitory computer readable storage medium provided by the present disclosure stores computer instructions, and the computer instructions are used to cause a computer to perform the random access method provided by the present disclosure.

As the non-transitory computer readable storage medium, the memory 1200 may be used to store non-transitory software programs, non-transitory computer executable programs and modules, such as program instructions/modules (for example, the determining module 100 and the triggering module 200 as shown in FIG. 14 and for example, the receiving module 800 as shown in FIG. 21) corresponding to the random access method in the embodiments of the present disclosure. By running the non-transitory software programs, instructions, and modules stored in the memory 1200, the processor 1100 executes various functional applications and data processing of a server, that is, realizes the random access method in the above method embodiments.

The memory 1200 may include a program storage area and a data storage area, where the program storage area may store an operating system and at least one application program required by functions; and the data storage area may store data created according to use of a positioning electronic device, etc. In addition, the memory 1200 may include a high-speed random access memory, and may further include a non-transitory memory such as at least one disk memory device, a flash memory device or other non-transitory solid stage memories. In an example, the memory 1200 alternatively includes the memories remotely located from the processor 1100, and these remote memories may be connected to the positioning electronic device through a network. Examples of the above network include, but are not limited to, the Internet, an enterprise Intranet, a local area network, a mobile communication network, and combinations thereof.

The electronic device for random access may further include: an input apparatus 1300 and output apparatus 1400. The processor 1100, the memory 1200, the input apparatus 1300 and the output apparatus 1400 may be connected with each other through buses or other manners. In FIG. 22, bus connection is taken as an example.

The input apparatus 1300 may receive input digital or character information, and generate a key input signal related to a user setting and function control of the positioning electronic device; for example, a touch screen, a keypad, a mouse, a trackpad, a touch tablet, an indicating arm, one or more mouse buttons, a trackball, a joy stick or other input apparatuses. The output apparatus 1400 may include a display device, an auxiliary lighting apparatus (for example, LED), a tactile feedback apparatus (for example, a vibration motor) and the like. The display device may include, but is not limited to: a liquid crystal display (LCD), a light emitting diode (LED) display and a plasma display. In some implementation manners, the display device may be a touch screen.

The implementation manners of the systems and technologies described herein may be realized in a digital electronic circuit system, an integrated circuit system, a dedicated application-specific integrated circuit (ASIC), computer hardware, firmware, software, and/or combinations thereof. The implementation manners may include: being implemented in one or more computer programs, the one or more computer programs may be executed and/or interpreted in a programmable system including at least one programmable processor, and the programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The computing programs (also known as programs, software, software applications, or codes) include machine instructions of the programmable processor, and may be implemented by virtue of an advanced process and/or an object-oriented programming language, and/or an assembly/machine language. As used therein, the terms 'machine-readable medium' and 'computer-readable medium' refer to any computer program products, devices, and/or apparatuses (such as magnetic disks, optical disks, memories, and programmable logic apparatuses (PLDs)) used for providing the machine instructions and/or data to the programmable processor, and include machine-readable mediums that receive the machine instructions which are taken as machine-readable signals. The term 'machine-readable signal' refers to any signal used for providing the machine instructions and/or data to the programmable processor.

In order to provide interaction with a user, the systems and technologies described herein may be implemented in a computer, the computer is provided with: a display apparatus (such as a cathode ray tube (CRT) or a liquid crystal display (LCD) monitor) used for displaying information to the user; and a keyboard and a pointing apparatus (such as a mouse or a trackball), and the user may provide input to the computer through the keyboard and the pointing apparatus. Other types of apparatuses may also be used for providing interaction with the user; for example, feedback provided to the user may be sensory feedback in any form (such as visual feedback, auditory feedback, or tactile feedback); and the input of the user may be received in any form (including vocal input, speech input, or tactile input).

The systems and technologies described herein may be implemented in a computing system (for example, as a data server) including a background component, or a computing system (for example, an application server) including a middleware component, or a computing system (for example, a user computer with a graphical user interface or a web browser through which the user may interact with the implementation manners of the systems and technologies described herein) including a front-end component, or a computing system including any combination of the background component, the middleware component, or the front-end component. The components of the system may be connected with each other through digital data communication (for example, a communication network) in any form or medium. Examples of the communication network include: a local area network (LAN), a wide area network (WAN), and the Internet.

The computer system may include a client and a server. The client and the server are generally far away from each other and usually interact through the communications network. A relationship between the client and the server is generated by computer programs running in respective computers and having a client-server relationship with each other.

According to the random access method in the embodiments of the present disclosure, the trigger source for 2-STEP random access may be determined; in response to the trigger source for 2-STEP random access, 2-STEP random access may be triggered. As a result, 2-STEP random access may be triggered based on the trigger source for 2-STEP random access, interaction steps and access delay are reduced.

The embodiments of the disclosure at least have the beneficial effects as follows:

According to the random access method in the embodiments of the disclosure, a trigger source for 2-STEP random access may be determined; and according to the trigger source for 2-STEP random access, 2-STEP random access is triggered correspondingly. As a result, 2-STEP random access is able to be triggered based on the trigger source for 2-STEP random access, and interaction steps and access delay are reduced.

It needs to be understood that, the steps may be reordered, added, or deleted by using the flows in various forms, which are shown above. For example, the steps recorded in the present disclosure may be performed concurrently, in order, or in a different order, provided that the desired result of the technical solutions disclosed in the present disclosure can be achieved, which is not limited herein.

The above specific implementations are not to be construed as limiting the scope of the present disclosure. It should be understood by those skilled in the art that various modifications, combinations, sub-combinations and alterations may occur depending on design requirements and other factors. Any modification, equivalent replacement, improvement, etc., made within the spirit and principles of the present disclosure shall be included in the protection scope of the present disclosure.

What is claimed is:

1. A random access method, comprising:
  determining a trigger source for 2-STEP random access; and
  according to the trigger source for the 2-STEP random access, triggering 2-STEP random access correspondingly;
  wherein triggering 2-STEP random access comprises:
  determining that the trigger source is beam failure recovery (BFR) for a secondary cell and there are no available uplink resources; and
  triggering the 2-STEP random access to request available uplink resources;
  wherein triggering 2-STEP random access comprises one of the following:
  determining that the trigger source is BFR for a primary cell and/or BFR for a primary secondary cell, and obtaining a network configuration of user equipment; and
  determining that the network configuration includes allowance of triggering 2-STEP random access when BFR for the primary cell is triggered and/or BFR for the primary secondary cell is triggered, and triggering 2-STEP random access for beam recovery; or
  determining that the trigger source is a regular buffer status report (BSR) and determining that there are no available uplink resources or failure of present available uplink resources to meet logical channel prioritization (LCP) mapping restriction of a logical channel, and triggering 2-STEP random access to request available uplink resources; or
  determining that the trigger source is a scheduling request (SR) and there are no available uplink resources, and triggering 2-STEP random access to obtain available uplink resources; or
  determining that the trigger source is small data transmission (SDT), and obtaining data radio bearer (DRB) that triggers the SDT; and determining that a network configuration of user equipment includes the DRB or a logical channel corresponding to the DRB being configured with 2-STEP random access or hybrid automatic repeat request (HARQ) with uplink (UL) retransmission disabled, and triggering 2-STEP random access for SDT; or
  determining that the trigger source is SDT, and obtaining a network configuration of user equipment; and determining that the network configuration includes allowance of the user equipment to trigger 2-STEP random access in inactive state, and triggering 2-STEP random access for SDT;
  wherein the random access method further comprises:
  obtaining a bandwidth part (BWP) selected by user equipment to initiate random access;
  determining that the BWP is configured with 2-STEP random access resources, obtaining reference signal received power (RSRP) for downlink path loss reference of the BWP, obtaining RSRP threshold corresponding to the trigger source which triggers 2-STEP random access, determining that the RSRP is greater than or equal to the RSRP threshold and initiating 2-STEP random access; or
  determining that the BWP is not configured with the 2-STEP random access resources, and initiating 4-STEP random access.

2. The random access method according to claim 1, wherein the available uplink resources comprise at least one of the following:
  available uplink resources for sending BFR media access control layer control element (MAC CE);
  available uplink resources for sending truncated BFR MAC CE; or
  available uplink resources with UL retransmission of corresponding HARQ not disabled.

3. The random access method according to claim 1, wherein the random access method further comprises:
  determining that the network configuration indicates contention free random access (CFRA) resources for BFR;
  obtaining a type of the CFRA resources for BFR; and
  triggering 2-STEP random access based on the type of the CFRA resources for beam recovery.

4. The random access method according to claim 1, wherein the random access method further comprises:
  determining that the network configuration includes allowance of triggering 2-STEP random access when BFR for the primary cell is triggered and/or BFR for the primary secondary cell is triggered, and the network configuration indicates contention free random access (CFRA) resources for BFR;
  obtaining a type of the CFRA resources for BFR; and triggering 2-STEP random access based on the type of the CFRA resources for beam recovery.

5. The random access method according to claim 1, wherein triggering the regular BSR comprises at least one of the following:

the network side being configured with a logical channel for 2-STEP random access;

the network side being configured with a logical channel of HARQ with UL retransmission disabled;

the network side being configured with a low-latency logical channel, wherein the logical channel is a traffic channel and/or a control channel; and the network side being configured to allow user equipment to use 2-STEP random access;

wherein the network configuration of user equipment is activated or deactivated through MAC CE or physical downlink control channel (PDCCH);

wherein the random access method further comprises:

determining that there are a plurality of regular BSRs and types of random access triggered by the plurality of regular BSRs are different, and selecting one type from a plurality of types to initiate random access; or determining that there are a plurality of regular BSRs and types of random access triggered by the plurality of regular BSRs are different, selecting the regular BSR triggered by the logical channel with a highest priority from the plurality of regular BSRs, and initiating random access based on a random access type triggered by the selected regular BSR.

6. The random access method according to claim 1, wherein determining that there are no available uplink resources and triggering 2-STEP random access to obtain available uplink resources comprises:

determining that there are no the scheduling request resources, and obtaining the trigger source for the SR;

determining that the trigger source for the SR is the regular BSR triggered by a logical channel for 2-STEP random access configured on the network side, or the regular BSR triggered by a logical channel which uses HARQ with UL retransmission disabled and is configured on the network side, or the BFR for the secondary cell, and triggering 2-STEP random access to request the available uplink resources;

wherein the network configuration of user equipment is activated or deactivated through MAC CE or PDCCH.

7. The random access method according to claim 1, wherein determining that there are no available uplink resources and triggering 2-STEP random access to obtain available uplink resources comprises:

determining that there are no the scheduling request resources, and obtaining the network configuration of user equipment; and determining that the network configuration includes allowance of the SR to trigger 2-STEP random access, and triggering 2-STEP random access to obtain the available uplink resources;

wherein the network configuration of user equipment is activated or deactivated through MAC CE or PDCCH.

8. The random access method according to claim 1, wherein determining that the network configuration of user equipment includes the DRB or a logical channel corresponding to the DRB being configured with 2-STEP random access or HARQ with UL retransmission disabled, and triggering 2-STEP random access for SDT comprises:

determining that there are a plurality of DRBs triggering the SDT;

obtaining the DRB with a highest priority;

determining that the network configuration of the user equipment includes the DRB with the highest priority or a logical channel corresponding to the DRB with the highest priority being configured with 2-STEP random access or HARQ with UL retransmission disabled; and triggering 2-STEP random access for SDT.

9. A random access method, comprising:

receiving a 2-STEP random access request sent by user equipment;

wherein the 2-STEP random access request is initiated by the user equipment based on a trigger source; or the 2-STEP random access request is a 2-STEP random access request configured to request available uplink resources and sent by the user equipment in response to determining that the trigger source is beam failure recovery (BFR) for a secondary cell and there are no the available uplink resources;

wherein the 2-STEP random access request is one of the following:

a 2-STEP random access request sent by the user equipment for beam recovery, wherein a network configuration of the user equipment is obtained by the user equipment in response to determining that the trigger source is BFR for a primary cell and/or BFR for a primary secondary cell; and 2-STEP random access request is sent by the user equipment for beam recovery in response to determining that the network configuration includes allowance of triggering 2-STEP random access when BFR for the primary cell is triggered and/or BFR for the primary secondary cell is triggered; or a 2-STEP random access request for requesting available uplink resources, which is sent by the user equipment in response to determining that the trigger source is a scheduling request (SR) and there are no scheduling request resources; or a 2-STEP random access request for small data transmission (SDT), which is sent by the user equipment in response to determining that the trigger source is SDT and a network configuration of the user equipment includes allowance of the user equipment to trigger 2-STEP random access in inactive state; or a 2-STEP random access request initiated by the user equipment in response to determining that bandwidth part (BWP) selected to initiate random access is configured with 2-STEP random access resources; wherein the user equipment determines that the BWP is configured with 2-STEP random access resources, obtains reference signal received power (RSRP) for downlink path loss reference of the BWP, obtains RSRP threshold corresponding to the trigger source which triggers 2-STEP random access, determines that the RSRP is greater than or equal to the RSRP threshold and initiates 2-STEP random access; or a 2-STEP random access request sent by the user equipment for requesting available uplink resources, wherein the 2-STEP random access is triggered to request available uplink resources by the user equipment in response to determining that the trigger source is a regular BSR, and determining that there are no the available uplink resources or present available uplink resources to meet logical channel prioritization (LCP) mapping restriction of a logical channel triggering the regular BSR; or a 2-STEP random access request sent by the user equipment for the SDT, wherein data radio bearer (DRB) that triggers SDT is obtained by the user equipment in response to determining that the trigger source is the SDT; and 2-STEP random access is triggered for SDT by the user equipment in response to determining that a network configuration of the user equipment includes the DRB or the logical channel corresponding to the DRB being configured with 2-STEP random access or hybrid automatic repeat request (HARQ) with uplink (UL) retransmission disabled; and wherein the random access method further comprises:

receiving a 4-STEP random access request initiated by the user equipment, wherein the 4-STEP random access request is a 4-STEP random access request initiated by user equipment in response to determining that BWP selected to initiate random access is not configured with 2-STEP random access resources.

10. The random access method according to claim 9, wherein the available uplink resources comprise at least one of the following:

available uplink resources for sending BFR media access control layer control element (MAC CE);

available uplink resources for sending truncated BFR MAC CE; or available uplink resources with UL retransmission of corresponding HARQ not disabled.

11. The random access method according to claim 9, wherein the 2-STEP random access request sent by the user equipment is:

a 2-STEP random access request for beam recovery, which is sent by the user equipment in following manner:

determining that the network configuration indicates contention free random access (CFRA) resources for BFR;

obtaining a type of the CFRA resources for BFR; and sending the 2-STEP random access request based on the type of the CFRA resources for BFR.

12. The random access method according to claim 9, wherein the 2-STEP random access request sent by the user equipment is:

a 2-STEP random access request for beam recovery, which is sent by the user equipment in the following manner:

determining that the network configuration includes allowance of triggering 2-STEP random access when BFR for the primary cell is triggered and/or BFR for the primary secondary cell is triggered;

triggering the 2-STEP random access;

determining that the network configuration indicates CFRA resources for BFR, obtaining a type of the CFRA resources for BFR;

sending the 2-STEP random access request based on the type of the CFRA resources for BFR.

13. The random access method according to claim 9, wherein triggering the regular BSR comprises at least one of the following:

the network side being configured with a logical channel for 2-STEP random access;

the network side being configured with a logical channel of HARQ with UL retransmission disabled;

the network side being configured with a low-latency logical channel, wherein the logical channel is a traffic channel and/or a control channel; and the network side being configured to allow user equipment to use 2-STEP random access;

wherein the network configuration of user equipment is activated or deactivated through MAC CE or physical downlink control channel (PDCCH);

the user equipment determines that there are a plurality of regular BSRs and types of random access triggered by the plurality of regular BSRs are different, and selects one type from a plurality of types to initiate random access; or the user equipment determines that there are a plurality of regular BSRs and types of random access triggered by the plurality of regular BSRs are different, selects the regular BSR triggered by the logical channel with a highest priority from the plurality of regular BSRs, and initiates random access based on a random access type triggered by the selected regular BSR.

14. The random access method according to claim 9, wherein the user equipment determines that the trigger source is SR and there are no scheduling request resources, obtains the trigger source for the SR, determines that the trigger source for the SR is the regular BSR triggered by a logical channel for 2-STEP random access configured on the network side, or the regular BSR triggered by a logical channel which uses HARQ with UL retransmission disabled and is configured on the network side, or BFR for the secondary cell, and triggers 2-STEP random access to request the available uplink resources;

wherein the network configuration of the user equipment is activated or deactivated through MAC CE or PDCCH.

15. The random access method according to claim 9, wherein the user equipment determines that there are no the scheduling request resources, obtains the network configuration of user equipment, determines that the network configuration includes allowance of the SR to trigger 2-STEP random access, and triggers 2-STEP random access to obtain the available uplink resources;

wherein the network configuration of the user equipment is activated or deactivated through MAC CE or PDCCH.

16. The random access method according to claim 9, wherein the user equipment determines that there are a plurality of DRBs triggering the SDT, obtains the DRB with a highest priority, determines that the network configuration of the user equipment includes the DRB with the highest priority or a logical channel corresponding to the DRB with the highest priority being configured with 2-STEP random access or hybrid automatic repeat request HARQ with UL retransmission disabled, and triggers 2-STEP random access for SDT.

17. An electronic device, comprising:

at least one processor; and a memory communicatively connected to the at least one processor, wherein the memory stores instructions executable by the at least one processor, and when the instructions are executed by the at least one processor, the at least one processor is configured to:

determine a trigger source for 2-STEP random access; and according to the trigger source for the 2-STEP random access, trigger 2-STEP random access correspondingly;

wherein triggering 2-STEP random access comprises:

determining that the trigger source is beam failure recovery (BFR) for a secondary cell and there are no available uplink resources; and triggering the 2-STEP random access to request available uplink resources;

wherein triggering 2-STEP random access comprises one of the following:

determining that the trigger source is BFR for a primary cell and/or BFR for a primary secondary cell, and obtaining a network configuration of user equipment; and determining that the network configuration includes allowance of triggering 2-STEP random access when BFR for the primary cell is triggered and/or BFR for the primary secondary cell is triggered, and triggering 2-STEP random access for beam recovery; or determining that the trigger source is a regular buffer status report (BSR) and determining that there are no available uplink resources or failure of present available uplink resources to meet logical channel prioritization (LCP) mapping restriction of a logical channel, and triggering 2-STEP random access to request available uplink resources; or determining that the trigger source is a scheduling request (SR) and there are no available uplink resources, and triggering 2-STEP random access to obtain available uplink resources; or determining that the trigger source is small data transmission (SDT), and obtaining data radio bearer (DRB) that triggers the SDT; and determining that a network configuration of user equipment includes the DRB or a logical channel corresponding to the DRB being configured with 2-STEP random access or hybrid automatic repeat request (HARQ) with uplink (UL) retransmission disabled, and triggering 2-STEP random access for SDT; or determining that the trigger source is SDT, and obtaining a network configuration of user equipment; and determining that the network configuration includes allowance of the user equipment to trigger 2-STEP random access in inactive state, and triggering 2-STEP random access for SDT:

wherein the random access method further comprises:

obtaining a bandwidth part (BWP) selected by user equipment to initiate random access;

determining that the BWP is configured with 2-STEP random access resources, obtaining reference signal received power (RSRP) for downlink path loss reference of the BWP, obtaining RSRP threshold corresponding to the trigger source which triggers 2-STEP random access, determining that the RSRP is greater than or equal to the RSRP threshold and initiating 2-STEP random access; or determining that the BWP is not configured with the 2-STEP random access resources, and initiating 4-STEP random access.

18. An electronic device, comprising:

at least one processor; and a memory communicatively connected to the at least one processor, wherein the memory stores instructions executable by the at least one processor, and the at least one processor is caused to, when the instructions are executed by the at least one processor, perform the random access method according to claim 9.

* * * * *